US008606001B2

(12) United States Patent
Yamada

(10) Patent No.: US 8,606,001 B2
(45) Date of Patent: Dec. 10, 2013

(54) IMAGE PROCESSING APPARATUS, METHOD, AND STORAGE MEDIUM TO IMPLEMENT IMAGE SEGMENTATION WITH HIGH ACCURACY

(75) Inventor: Hideshi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 13/222,891

(22) Filed: Aug. 31, 2011

(65) Prior Publication Data

US 2012/0057783 A1     Mar. 8, 2012

(30) Foreign Application Priority Data

Sep. 6, 2010    (JP) ................................ P2010-199106

(51) Int. Cl.
    *G06K 9/00*     (2006.01)

(52) U.S. Cl.
    USPC ............ 382/165; 382/170; 382/190; 382/195

(58) Field of Classification Search
    None
    See application file for complete search history.

(56) References Cited

U.S. PATENT DOCUMENTS

| 7,609,888 | B2 | 10/2009 | Sun et al. | |
|---|---|---|---|---|
| 2007/0154066 | A1* | 7/2007 | Lin et al. | 382/103 |
| 2007/0237393 | A1 | 10/2007 | Zhang et al. | |
| 2008/0025609 | A1* | 1/2008 | Yashiro et al. | 382/181 |
| 2010/0172591 | A1* | 7/2010 | Ishikawa | 382/224 |
| 2010/0246939 | A1* | 9/2010 | Aisaka et al. | 382/156 |

* cited by examiner

*Primary Examiner* — Samir Ahmed
*Assistant Examiner* — Siamak Harandi
(74) *Attorney, Agent, or Firm* — Sherr & Jiang, PLLC

(57) ABSTRACT

An image processing apparatus includes a feature vector extraction unit that extracts feature vectors of sample pixels, for each local region including the sample pixels, in an input image; a weight calculation unit that calculates weights for the local regions on the basis of the positional relationship with the local regions, for divided regions that divide the input image; a feature distribution model calculation unit that calculates an average with weights as a feature distribution model in a local region obtained by adding the weights calculated from the local regions to the feature vectors of the local regions, for each of the divided regions; and a pixel likelihood calculation unit that calculates pixel likelihood for each pixel in the input image on the basis of the feature distribution model.

8 Claims, 16 Drawing Sheets

IMAGE PROCESSING APPARATUS, METHOD, AND STORAGE MEDIUM TO IMPLEMENT IMAGE SEGMENTATION WITH HIGH ACCURACY

BACKGROUND

The present disclosure relates to image processing apparatus and method, and a program, particularly, image processing apparatus and method, and a program which makes it possible to implement segmentation with high accuracy.

Separating an object image (object image or foreground image) in an image from the background image is useful for many applications, such as image editing or video processing.

In many methods, an object image is separated from the background image, with the color information of an image as a clue.

The color information is used to calculate likelihood that is obtained from a model corresponding to the color of a pixel by calculating a probability model by using the colors of the pixels of all of the image or a designated portion. The color of the object or the color of the background for calculating the probability model is designated by preprocess, such as marking some pixels of the object or the background area image by a user or by executing a predetermined software program.

It is possible to separate an object from a likelihood difference based on the difference in color distribution state of the background image or the object image, in a simple image.

The color distribution is complicated in a more general image and an unclear separation result of the object image and the background image is obtained in likelihood determined by the color distribution of the entire image, in many cases.

A method of improving the color separation may be considered by not globally obtaining the color distribution model, using the colors of the entire image, but locally obtaining to be changed for each image region.

As one method of calculating a local color model, a method of disposing a small window group on the border of the object expected from movement by using a small change due to movement of an object with continuous images of a video, calculating the color distribution model in the small window group, and performing separation optimization calculation of the object image and the background image has been proposed (see U.S. Pat. No. 7,609,888, titled "separating a video object from a background of a video sequence").

As a color distribution model, there is a method of calculating and using a five-dimensional probability model including the XY-image space position, in addition to three dimensions of RGB, using Gaussian Mixture Model (GMM) (see US2007/0237393, titled "image segmentation using spatial-color Gaussian mixture models").

SUMMARY

However, it is necessary to designate the position of a small window at the position corresponding to the object border by providing an approximate shape of the object in order to apply the method of U.S. Pat. No. 7,609,888, titled "separating a video object from a background of a video sequence" to a frozen image. Further, it is necessary to designate a slightly large window size for safety because the outline of the object is determined only from the inside of the small window. As described above, there are many conditions to input in the method of U.S. Pat. No. 7,609,888, titled "separating a video object from a background of a video sequence".

Further, it is necessary to increase the number of five-dimensional Gauss functions constituting the GMM in order to represent the detailed color distribution in the method of US2007/0237393, titled "image segmentation using spatial-color Gaussian mixture models", such that it is not considered as being efficient.

The present disclosure has been made in consideration of the situations, and particularly, it is desirable to separate an object image with high accuracy from an input image by efficiently calculating a local color distribution model and calculating likelihood of a pixel with high degree of separation.

An image processing apparatus according to an embodiment of the present disclosure includes a feature vector extraction unit that extracts feature vectors of sample pixels, for each local region including the sample pixels, in an input image; a weight calculation unit that calculates weights for the local regions on the basis of the positional relationship with the local regions, for divided regions that divide the input image; a feature distribution model calculation unit that calculates an average with weights as a feature distribution model in the local region obtained by adding the weights calculated for the local regions to the feature vectors of the local regions, for each of the divided regions; and a pixel likelihood calculation unit that calculates pixel likelihood for each pixel in the input image on the basis of the feature distribution model.

The feature vector extraction unit may extract the color of the pixels in the local region, a motion vector, depth, a filter response value, or a normal vector as the feature vector, for each of the local regions including the sample pixels in the input image.

The sample pixels may include information of discriminating the position where an object exists in the input image.

The weight calculation unit may calculate weights for the local regions, for each of the divided regions, on the basis of the distances between the divided regions and the local regions in an image space, or the distance between frames in a motion image implemented by a plurality of the images.

The local regions and the divided regions may be block structures that hierarchically divide the input image, and the weight calculation unit may calculate weights for the local regions, for each of the divided regions, on the basis of the distances between the divided regions in the image and the local regions of an upper hierarchy than the hierarchy of the divided regions in an image space, or the distance between frames in a motion image implemented by a plurality of images.

The feature distribution mode calculation unit may generate multidimensional histograms of quantized quantization vectors of the local regions, for each of the divided regions, add the weight to the multidimensional histogram, and calculate a feature model of the divided regions.

The feature distribution model calculation unit may obtain color samples from two or more representative colors of the input image, add the weight to histograms of the identification number of the color samples in the local regions, and calculate a feature distribution model of the divided regions.

An image processing method of an image processing apparatus according to another embodiment of the present disclosure, which includes a feature vector extraction unit that extracts feature vectors of sample pixels, for each local region including the sample pixels, in an input image; a weight calculation unit that calculates weights for the local regions on the basis of the positional relationship with the local regions, for divided regions that divide the input image; a feature distribution model calculation unit that calculates an average with weights as a feature distribution model obtained by adding the weights calculated for the local regions to the feature vectors of the local regions, for each of the divided regions; and a pixel likelihood calculation unit that calculates pixel likelihood for each pixel in the input image on the basis of the feature distribution model; includes extracting feature vectors of the sample pixels, for each of the local regions including the sample pixels in the input image, with the feature vector extraction unit; calculating weight for each of the local regions on the basis of the positional relationship with the local regions, for each of the divided regions of the input image, with the weight calculation unit; calculating a average with weights obtained by adding the weights calculated for each of the local regions to the feature vectors of the local regions, for each of the divided regions, as a feature distribution model of the local regions, with the feature distribution model calculation unit; and calculating pixel likelihood for each of the pixels in the input image on the basis of the feature distribution model, with the pixel likelihood calculation unit.

A program according to still another embodiment of the present disclosure performs a process including extracting feature vectors of the sample pixels, for each of the local regions including the sample pixels in the input image, with the feature vector extraction unit; calculating weight for each of the local regions on the basis of the positional relationship with the local regions, for each of the divided regions of the input image, with the weight calculation unit; calculating a average with weights obtained by adding the weights calculated for each of the local regions to the feature vectors of the local regions, for each of the divided regions, as a feature distribution model of the local regions, with the feature distribution model calculation unit; and calculating pixel likelihood for each of the pixels in the input image on the basis of the feature distribution model, with the pixel likelihood calculation unit, in a computer controlling an image processing apparatus including: a feature vector extraction unit that extracts feature vectors of sample pixels, for each local region including the sample pixels, in an input image; a weight calculation unit that calculates weights for the local regions on the basis of the positional relationship with the local regions, for divided regions that divide the input image; a feature distribution model calculation unit that calculates an average with weights as a feature distribution model in the local region obtained by adding the weights calculated for the local regions to the feature vectors of the local regions, for each of the divided regions; and a pixel likelihood calculation unit that calculates pixel likelihood for each pixel in the input image on the basis of the feature distribution model.

An image processing apparatus according to still another embodiment of the present disclosure includes a pixel likelihood calculation unit that extracts feature vectors of sample pixels, for each local region including the sample pixels, in an input image; calculate weights for the local regions on the basis of the positional relationship with the local regions, for divided regions that divide the input image, calculates an average with weights as a feature distribution model in the local region obtained by adding the weights calculated for the local regions to the feature vectors of the local regions, for each of the divided regions, and calculates pixel likelihood for each pixel in the input image on the basis of the feature distribution model.

The image processing apparatus according to the embodiment of the present disclosure may be an independent apparatus or a block that performs an image process.

According to the embodiment of the present disclosure, it is possible to separate an object image from an input image, with high accuracy.

DETAILED DESCRIPTION OF EMBODIMENTS

Hereinafter, embodiments of the present disclosure (hereafter, referred to as embodiments) are described. Further, it is assumed that the description is provided in the following order.

1. First embodiment (an example of not hierarchizing, but blocking an input image)

2. Second embodiment (an example of hierarchizing and blocking an input image)

1. First Embodiment

[Configuration Example of a Likelihood Map Calculation Device]

Figure 1:
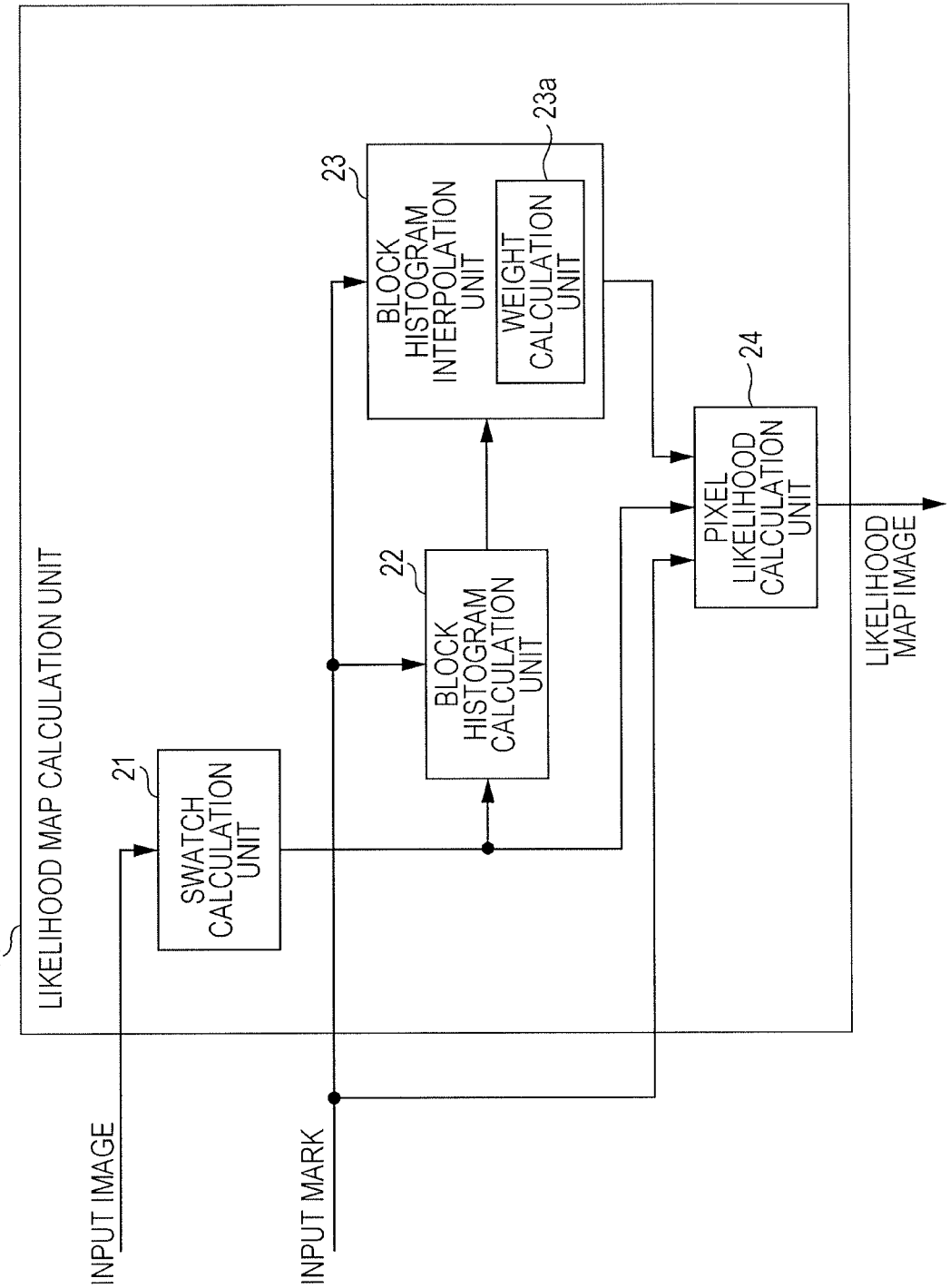
FIG. 1 is a block diagram showing the configuration example of an embodiment of a likelihood map calculation device where the present disclosure is applied.

FIG. 1 shows a configuration example of an embodiment of hardware of a likelihood map calculation device where the present disclosure is applied. The likelihood map calculation device of FIG. 1 generates and outputs a likelihood map image from an input image and the information on a mark (input mark) discriminating an object (foreground) region from a background region in the input image.

Figure 2:
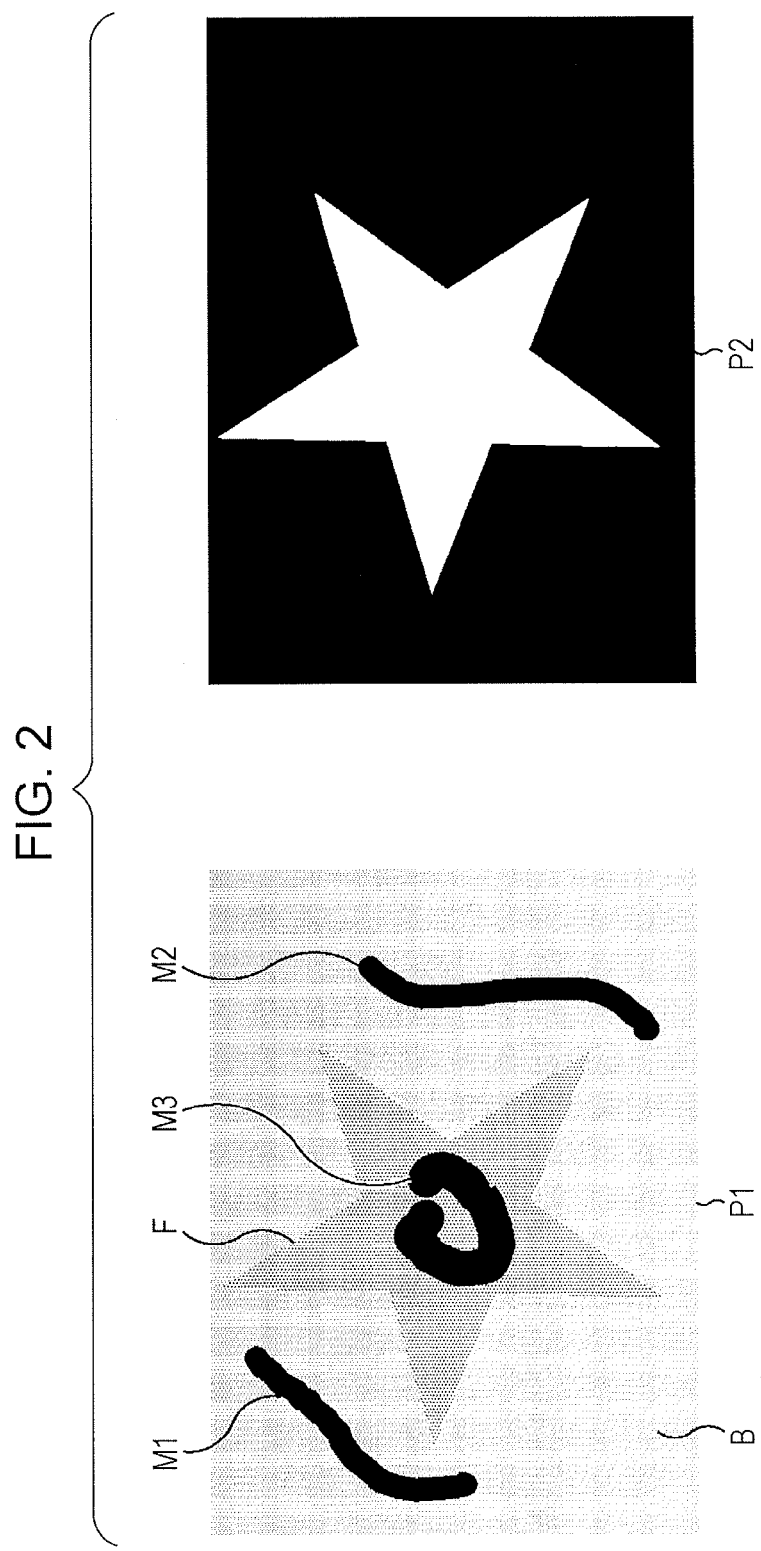
FIG. 2 is a diagram showing an example of an input image and a likelihood map image by the likelihood map calculation device of FIG. 1.

In detail, the likelihood map calculation device 11 generates and outputs a likelihood map image P2 of FIG. 2 on the basis of an input image P1 shown in FIG. 2 and marks M1 and M2 of a background image input on the input image P1, on the basis of the information on the mark M3 of the object region. The input image P1 of FIG. 2 is composed of a star-shaped object image F and another background image B. Therefore, in the likelihood map image P2, ideally, the likelihood of the pixel of a region corresponding to the star-shaped object image F is 1.0 and the likelihood of the pixel of a region corresponding to the background image B is 0.0. In the likelihood map image P2, the pixel value of each pixel is set in accordance with the likelihood, such that the region of the star shape corresponding to the object image F is a white image and the region corresponding to the background image B is a black image.

The mark M3 of the object region and the marks M1 and M2 discriminating the background image in the input image P1 may be input in a pixel unit by operating an operation portion (not shown), such as a keyboard or a mouse, by a user. Further, the marks M1 to M3 may be information automatically input on the basis of the input image by an exclusive software program or the like. In addition, for example, by inputting a border to surround the entire object region, the inside of the border may be the mark of the object region and other may be the mark of the background region. In this case, it is not necessary to accurately input the border at the interface if the border substantially agrees with the actual interface of the input image.

The likelihood map calculation device 11 is composed of a swatch calculation unit 21, a block histogram calculation unit 22, a block histogram interpolation unit 23, and a pixel likelihood calculation unit 24.

The swatch calculation unit 21 calculates a swatch and the swatch ID of a pixel and supplies the swatch and the swatch ID to the block histogram calculation unit 22 and the pixel likelihood calculation unit 24 on the basis of the input image. The swatch is a color sample that extracts and conserves colors in an arrangement usually represented in an input image. The number Sn of color samples conserving the swatch is a value set as a variable parameter, and for example, the number of color samples Sn may be 256. The swatch calculation unit 21 calculates the swatch, using a machine learning algorithm, such as a k-means method (image processing <image processing standard text book>, see CG-ARTS association) or a k-center method. Further, the swatch ID is information on each pixel and in the embodiment is a number for classifying to which numbered color of the swatch the color of the pixel is the closest and may be generally additionally requested in the process of machine leaning.

The block histogram calculation unit 22 divides the input image to a predetermined number of blocks for each predetermined width and generates a block histogram that is a histogram in a block unit, on the basis of the input mark, swatch, and swatch ID, in the divided block unit. In this case, the block histogram calculation unit 22 generates a foreground block histogram for a foreground when the number of pixels with foreground (object) marks in the block unit is larger than a predetermined number. Further, the block histogram calculation unit 22 generates a background block histogram for a background when the number of pixels with background marks in the block unit is larger than a predetermined number. That is, when the numbers of both the mark of the foreground and the mark of the background are larger than the predetermined number, the block histogram calculation unit 22 generates a foreground block histogram and a background block histogram. Further, when the number of the pixels of any mark is not larger than the predetermined number, the block histogram calculation unit 22 does not generate a block histogram for the block and sets the block as an interpolation generation block. Further, the block histogram calculation unit 22 supplies the generated block histogram and the information on the interpolation-object block to the block histogram interpolation unit 23.

The block histogram counts the swatch IDs, not the colors themselves of the pixels in the block. Accordingly, the block histogram is made a feature vector of the dimension of the number Sn of color samples of the swatch. As described above, by processing in the block unit, since the three-dimensional histogram is not necessary to store and maintain large size of data for each block, a process of efficiently obtaining color distribution can be possible even with a small memory.

The block histogram interpolation unit 23 generates foreground and background block histograms by interpolation, using the block histogram calculated for the interpolation-object block, on the basis of the information on the input mark, the block histogram, and the interpolation-object block. The block histogram interpolation unit 23 supplies the interpolation-generated foreground block histogram and background block histogram to the pixel likelihood calculation unit 24.

In more detail, the block histogram interpolation unit 23 extracts the block of the block histogram of which the count is 0 as the interpolation-object block, in the foreground and background block histograms supplied from the block histogram calculation unit 22. The block histogram interpolation unit 23 sets weight corresponding to the distance between the interpolation-object block and the block with the block histogram except for the interpolation-object block calculated, that is, the block histogram of the block of the interpolation source, by controlling a weight calculation unit 23a. Further, the block histogram interpolation unit 23 obtains average weight from the weights set by the weight calculation unit 23a, for the whole block histograms supplied from the block histogram calculation unit 22, and generates the block histogram of the interpolation-object block.

The pixel likelihood calculation unit 25 generates and outputs a likelihood map image by calculating the likelihood in a pixel unit on the basis of the input mark 11, the swatch and swatch ID from the swatch calculation unit 21, and the block histogram supplied from the block histogram interpolation unit 23.

[Likelihood Map Generation Process]

Next, a likelihood map generation process is described with reference to the flowchart of FIG. 3.

In step S1, the swatch calculation unit 21 extracts the colors usually represented in the input image as much as the number Sn of color samples and conserves them in an arrangement, and calculate the swatch composed of the color samples.

In step S2, the swatch calculation unit 21 classifies a color that is the closest to the number Sn of color samples, for each pixel, on the basis of the swatch, and sets the swatch ID as the classification number of the corresponding color. Further, the swatch calculation unit 21 supplies the calculated swatches and the swatch IDs of the pixels to the block histogram calculation unit 22 and the pixel likelihood calculation unit 24.

In step S3, the block histogram calculation unit 22 divides the input image into local regions composed of Bw pixels× Bw pixels, with a Bw pixel interval, in the horizontal direction and the vertical direction.

In step S4, the block histogram calculation unit 22 performs a block histogram calculation process and generates a block histogram for each of the blocks divided by the process described above.

[Block Histogram Calculation Process]

Here, the block histogram calculation process is described with reference to the flowchart of FIG. 4.

In step S21, the block histogram calculation unit 22 sets a non-processed block as a process-object block.

In step S22, it is determined whether the pixels marked as the foreground is larger than a predetermined threshold value T_mark, in the pixels included in the process-object block. That is, when the input image is the input image P1 of FIG. 2, it is determined whether the number of pixels pertaining to the pixels input as the mark M3 representing the star-shaped object (foreground) region is included more than the predetermined threshold value T_mark in the process-object block. Further, the predetermined threshold value T_mark is a value set in accordance with the number of pixels included in the divided block, and for example, may be set as a ratio to total number of pixels Pix (=Bw pixels×Bw pixels) included in the block.

In step S22, for example, in the pixels included in the process-object block, when the pixels marked as the foreground is included more than the threshold value T_mark, the process proceeds to step S23.

Figure 5:
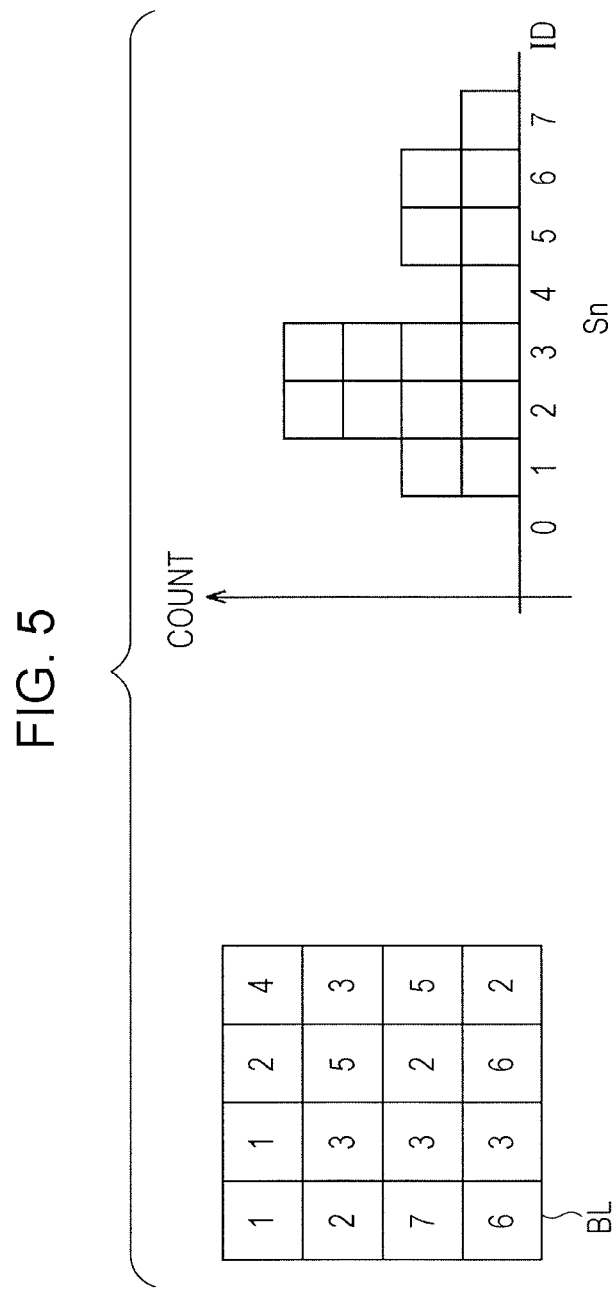
FIG. 5 is a diagram illustrating a block histogram calculation process by the likelihood map calculation device of FIG. 1.

In step S23, the block histogram calculation unit 22 obtains the foreground block histogram for the process-object block. For example, when the block is implemented as shown at the left side of FIG. 5, the histogram shown at the right side of FIG. 5 is obtained. That is, at the left side of FIG. 5, the clearance representing the size of the block is a Bw=4 pixel, one square represents a pixel in the figure, and the block BL is composed of total sixteen pixels. At the left side of FIG. 5, the number described in each mass corresponding to each pixel represents the swatch ID. In FIG. 5, when the number Sn of color samples of the swatch is 8 (swatch ID=0 to 8) is exemplified, and the swatch IDs are 1, 1, 2, and 4 from the left and 2, 3, 5, and 3 from left in the second column, sequentially from the top column. Further, in the third column, the swatch IDs are 7, 3, 2, and 5 from the left, and in the fourth column, the swatch IDs are 6, 3, 6, and 2. Further, in the embodiment, the value of each mass does not directly represent the color of each pixel, but represents the swatch ID the closest to the color of the color sample obtained as the swatch.

Further, according to the left side of FIG. 5, the block histogram calculation unit 22 generates the foreground block histogram shown at the right side of FIG. 5. As shown by the histogram at the right side of FIG. 5, in accordance with the distribution of swatch IDs shown at the left side of FIG. 5, foreground block histograms, in which the count number (pixel number) of the swatch ID=0 is 0, the count number of the swatch ID=1 is 2, the count number of the swatch ID=2 is 4, the count number of the swatch ID=3 is 4, the count number of the swatch ID=4 is 1, the count number of the swatch ID=5 is 2, the count number of the swatch ID=6 is 2, and the count number of the swatch ID=7 is 1, are generated.

When the foreground block histograms are collected, it is represented as (ID=0, ID=1, ID=2, ID=3, ID=4, ID=5, ID=6, ID=7)=(0, 2, 4, 4, 1, 2, 2, 1). That is, the block histograms are obtained by feature vectors of the process-object block represented in Sn-dimensions of the number Sn of color samples.

In step S24, the block histogram calculation unit 22 determines whether the total number of samples of the foreground block histograms is smaller than a predetermined threshold value T_hist. In step S24, for example, when the total number of samples of the foreground block histograms is larger than the predetermined threshold value T_hist, that is, when the swatch IDs close to the colors considered as the swatches in the color samples of the pixels in the process-object block are not set and the pixels that are not counted in the histogram are small in number, the process proceeds to step S25.

In step S25, the block histogram calculation unit 22 performs normalization by dividing the information on the foreground block histograms by the total count number and supplies the foreground block histogram of the process-object block to the block histogram interpolation unit 23. That is, in FIG. 5, since the swatch IDs are obtained for all of the sixteen pixels, the total count number is 16, such that foreground block histograms (0, 2, 4, 4, 1, 2, 2, and 1) are normalized into (0, 2/16, 4/16, 4/16, 1/16, 2/16, 2/16, 1/16) by being divided by 16.

Meanwhile, in step S22, for example, when the pixels marked as the foreground in the pixels included in the process-object block are not included more than the predetermined threshold value T_mark, or for example, when the total number of the samples constituting the foreground block histogram is less than the predetermined threshold value T_hist, the process proceeds to step S26.

In step S26, the block histogram calculation unit 22 sets the process-object block as a foreground interpolation-object block and supplies the information to the block histogram interpolation unit 23. That is, when the pixels marked as the foreground in the pixels included in the process-object block is not included more than the predetermined threshold value T_mark, or when the total number of the samples constituting the foreground block histogram is not less than the predetermined threshold value T_hist, the block histogram calculation unit 22 does not obtain the foreground block histogram for the process-object block, and once sets the process-object block as a foreground interpolation-object block. In more detail, the block histogram calculation unit 22 generates a foreground block histogram of which the total count number is 0, and correspondingly represents that the block is the foreground interpolation-object block.

That is, the foreground block histograms are sequentially obtained, for the block that is a local region including the pixels marked as the object (foreground) larger than the predetermined threshold value T_mark. Accordingly, the foreground block histogram obtained in this case is the color feature information on the local area composed of the pixels constituting the foreground, and in the shape, becomes a vector of the dimension of the number Sn of color samples, such that the foreground block histogram may be referred to as a feature vector of a local region.

Further, since the process in steps S27 to S31 is basically the same process, except that the foreground block histogram obtained in steps S22 to S26 is the background histogram, such that the description is omitted.

In step S32, the block histogram calculation unit 22 determines whether there is a non-processed block. In step S32, when it is determined that there is a non-processed block, the process returns to step S21. That is, steps S21 to S32 are repeated until there is no non-processed block, and a foreground block histogram and a background block histogram are obtained for all of the blocks. Further, in the foreground block histogram and the background block histogram, the blocks of which the foreground block histogram or the background block histogram is not calculated are implemented by vectors of which all of the components are 0, such that the blocks are set as foreground interpolation-object block or a background interpolation-object block.

Further, in step S32, when it is determined that there is no non-processed block, the process proceeds to step S33.

In step S33, the block histogram interpolation unit 23 obtains the block histograms of the interpolation-object blocks for the foreground and the background by performing a block histogram interpolation process, on the basis of the block histograms for the foreground and the background and the information on the interpolation-object blocks which are supplied from the block histogram calculation unit 22.

[Block Histogram Interpolation Process]

Figure 6:
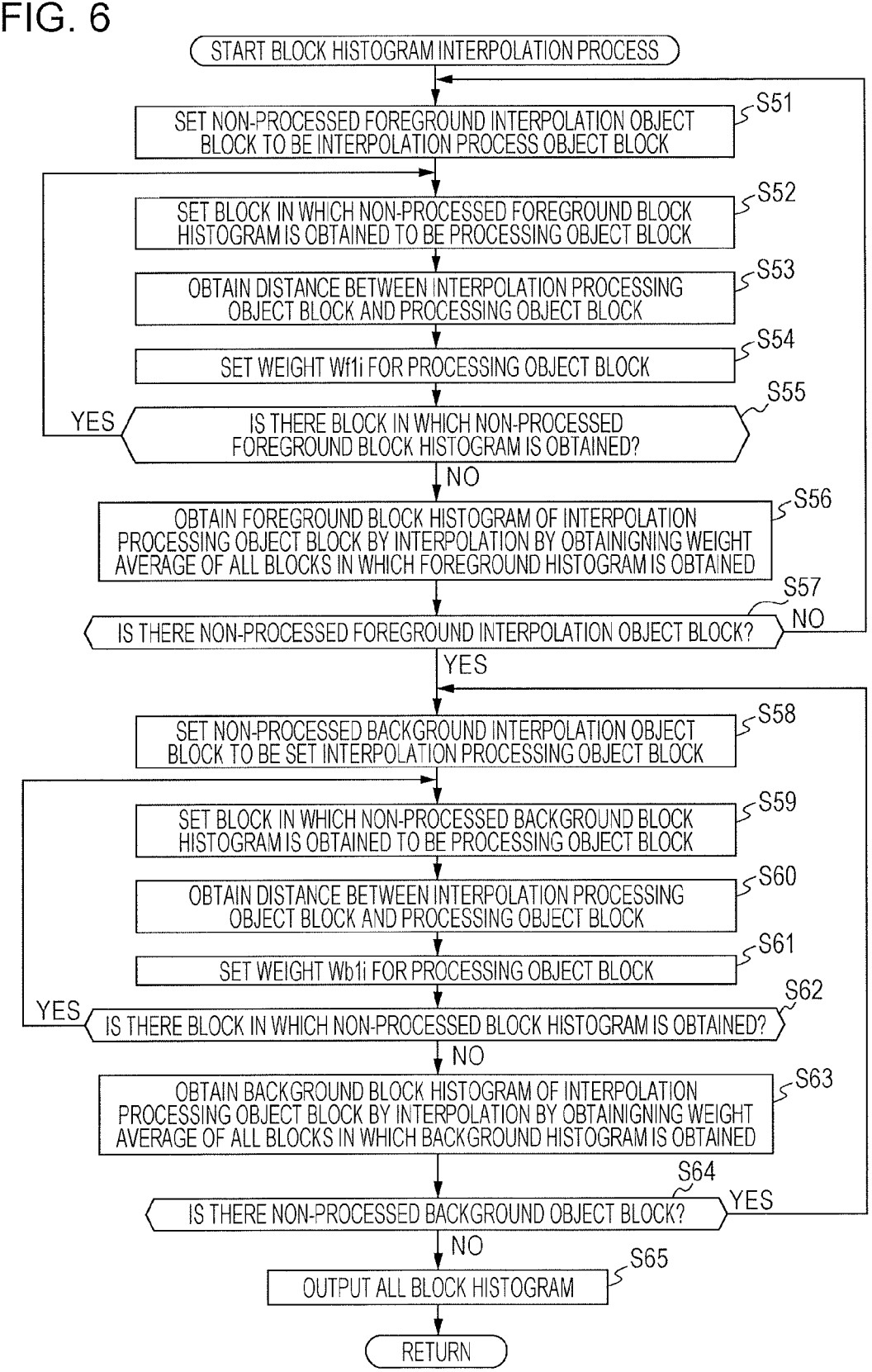
FIG. 6 is a flowchart illustrating a block histogram interpolation process by the likelihood map calculating device of FIG. 1.

Here, the block histogram interpolation process is described with reference to the flowchart of FIG. 6.

In step S51, the block histogram interpolation unit 23 sets a non-processed foreground interpolation-object block as an interpolation process-object block.

In step S52, the block histogram interpolation unit 23 sets a block of which the non-processed foreground block histogram is obtained as a process-object block BLi. Further, "i" is an identifier that discriminates the block of which the foreground block histogram is obtained.

In step S53, the block histogram interpolation unit 23 obtains the distance di between the interpolation process-object block and the process-object block BLi. In more detail, the block histogram interpolation unit 23 obtains the distance between the center position of the interpolation process-object block and the center position of the process-object block as the distance di. Further, the distance may be the relative distance of the interpolation process-object block and the process-object block, such that the distance may not be the distance between the center position or may be the distance between other positions.

In step S54, the block histogram interpolation unit 23 sets the weight Wf1i corresponding to the process-object block by calculating the following formula (1) on the basis of the obtained distance di by controlling the weight calculation unit 23a.

$$Wf1i = \exp(\lambda \times di) \quad (1)$$

where $\lambda$ is a parameter that adjust an increase and a decrease in weight Wf1i. As expressed in the formula (1), the smaller the distance di, that is, the smaller the distance between the interpolation process-object block and the process-object block BLi, the larger the weight Wf1i is set, and the larger the distance, the smaller the weight is set.

Figure 7:
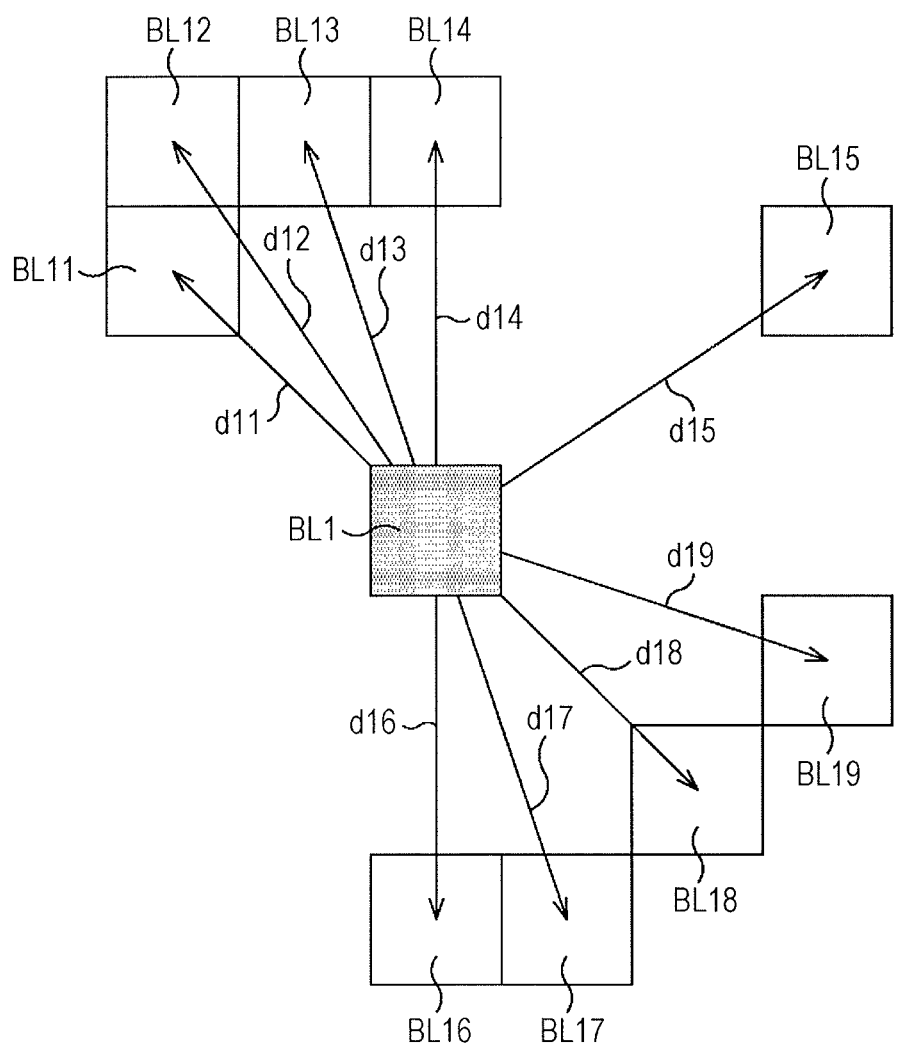
FIG. 7 is a diagram illustrating a block histogram interpolation process by the likelihood map calculating device of FIG. 1.

In step S55, the block histogram interpolation unit 23 determines whether there is a block of which the non-processed foreground histogram is obtained, and when there is a block of which the non-processed foreground histogram is obtained, the process returns to step S52. That is, as shown in FIG. 7, in all of the blocks BL11 and BL12 of which the foreground block histograms are obtained, the distance d11 and d19 from the foreground interpolation process-object block BL1 are obtained, and the processes of steps S52 to S55 are repeated until the weights Wf1i corresponding to the distances are obtained.

Further, in step S55, when it is determined there is no block of which the non-processed foreground block histogram is obtained, the process proceeds to step S56.

In step S56, the block histogram interpolation unit 23 obtains the average value with the weight Wf1i, for the obtained foreground block histograms, by calculating the equation expressed in the following formula (2), thereby interpolating and generating the block histograms of the interpolation process-object blocks.

$$H = (\Sigma Wf1i \times Hi) / \Sigma Wf1i \quad (2)$$

where, H is the foreground block histogram of the interpolated interpolation process-object block, Wf1i is the set weight of the block BLi of which the foreground block histogram is obtained by calculation, and Hi is the foreground block histogram of the block BLi that is obtained by calculation.

That is, the foreground block histogram H of the interpolated interpolation process-object block makes the foreground block histogram of the block BLi of which the foreground block histogram is obtained by calculation an average value with the weight Wf1i of the block. In other words, it may be said that the foreground block histogram that has been interpolated and calculated is the feature distribution model of a local region that is estimated by averaging the feature vectors of a plurality of local regions obtained as color distribution of a pixel set as the foreground by a mark, in the weight corresponding to the distance between the blocks. Further, since the foreground block histogram obtained by interpolation in the feature distribution model is obtained as a vector of the same dimension as the feature vector, it is substantially considered equivalently to the feature vector.

In step S57, the block histogram interpolation unit 23 determines whether there is a non-processed foreground interpolation-object block, and when it exists, the process returns to step S51. That is, in all of the foreground interpolation-object blocks, the processes of step S51 to S57 are repeated until the foreground block histograms are obtained by interpolation using all of the foreground block histograms obtained by calculation. Further, in step S57, when there is no non-processed foreground interpolation-object block, that is, when it is determined that the foreground block histograms are obtained by interpolation using all of the foreground block histograms obtained by calculation, the process proceeds to step S58.

Further, for the function of the weight Wf1i illustrated with reference to the formula (2), other equations may be used, and for example, not a window function that is 0 when exceeding a predetermined distance or the spatial distance, but the difference between the feature vectors may be the weight. Further, for the method of interpolating the foreground block histogram, methods other than the method described above may be possible, and for example, the block histogram may be interpolated, using a mathematical method, such as the least square method or the conjugate gradient method, which is a numerical solution of a linear simultaneous equation, as a problem of Markov random field determining the value, depending on the adjacent blocks. Further, the foreground block histogram of an interpolation source obtained by calculation may be calculated as the existing fixed value, a value stochastically obtained through the adjacent dependency from the histogram of the block of which the histogram of the foreground interpolation-object block is the interpolation source.

Further, the process in steps S58 to S64 is the same as the process in steps S51 to S57 except that the block that is the process-object is a background interpolation-object block instead of the foreground interpolation-object block and the expression of the obtained weight is a weight Wb1 instead of the weight Wb1i, and the description is not provided.

In step S65, the block histogram interpolation unit 23 outputs the block histograms for the foreground and the background obtained by calculation and the block histograms for the foreground and the background obtained by interpolation, to the pixel likelihood calculation unit 24.

Figure 4:
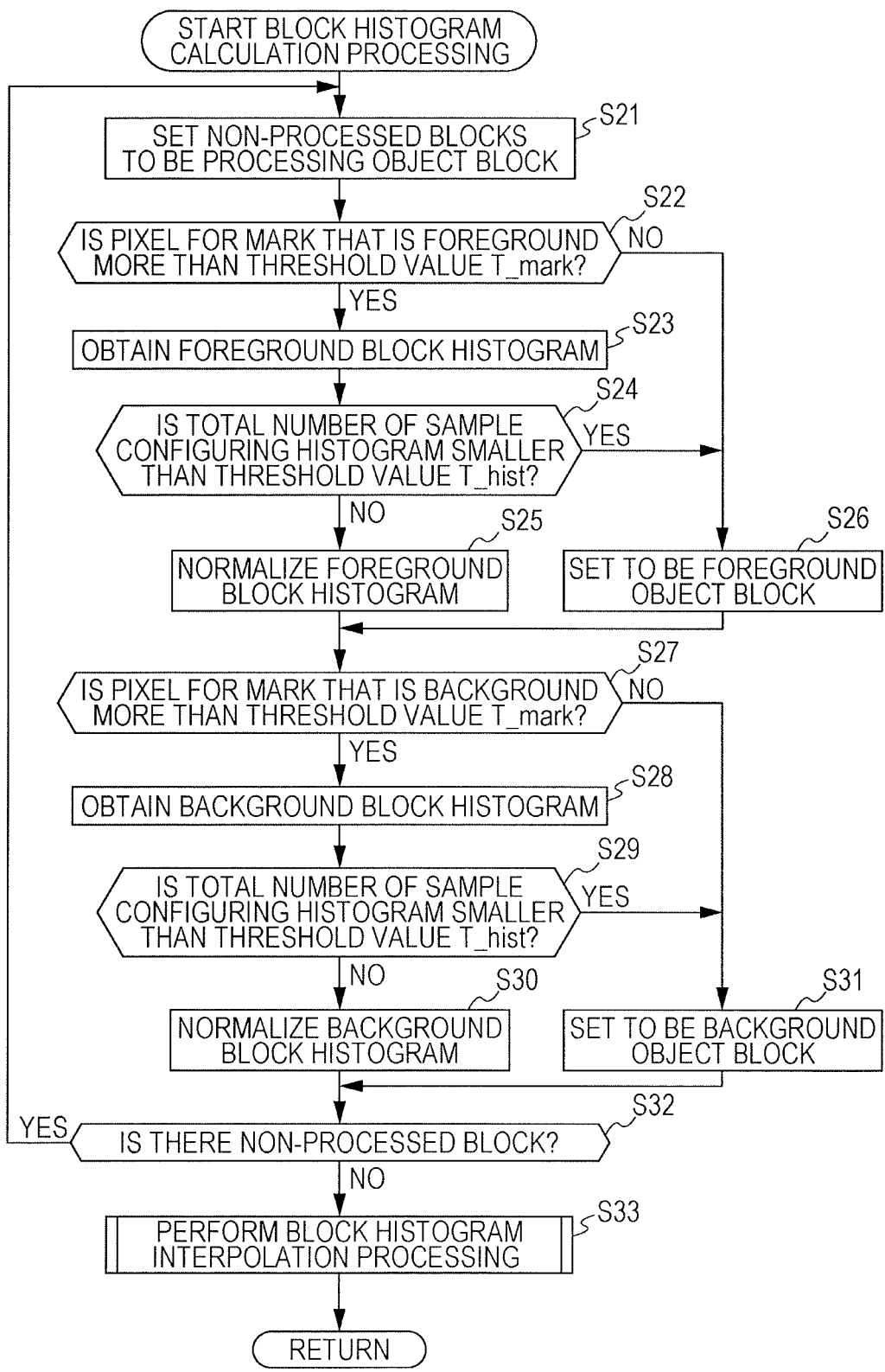
FIG. 4 is a flowchart illustrating a block histogram calculation process by the likelihood map calculation device of FIG. 1.

Return to the illustration of the flowchart of FIG. 4 here. As the block histogram interpolation of step S33 is finished, the block histogram calculation is finished.

That is, by the above process, the foreground block histogram of the foreground interpolation-object block and the background block histogram of the background interpolation-object block are obtained by the foreground block histogram and the background block histogram obtained by calculation. The process, in other words, is a process of obtaining the color distribution model of the local region not including the pixels with the marks for the foreground and the background more than the predetermined threshold value T_mark, using the feature vector obtained by the local region including the pixels marked as the foreground and the background more than the predetermined threshold value T_mark. As a result, the information on the color distribution model for the foreground and the background for each local region is obtained, for the local regions constituting the blocks of the entire region of the input image.

Figure 3:
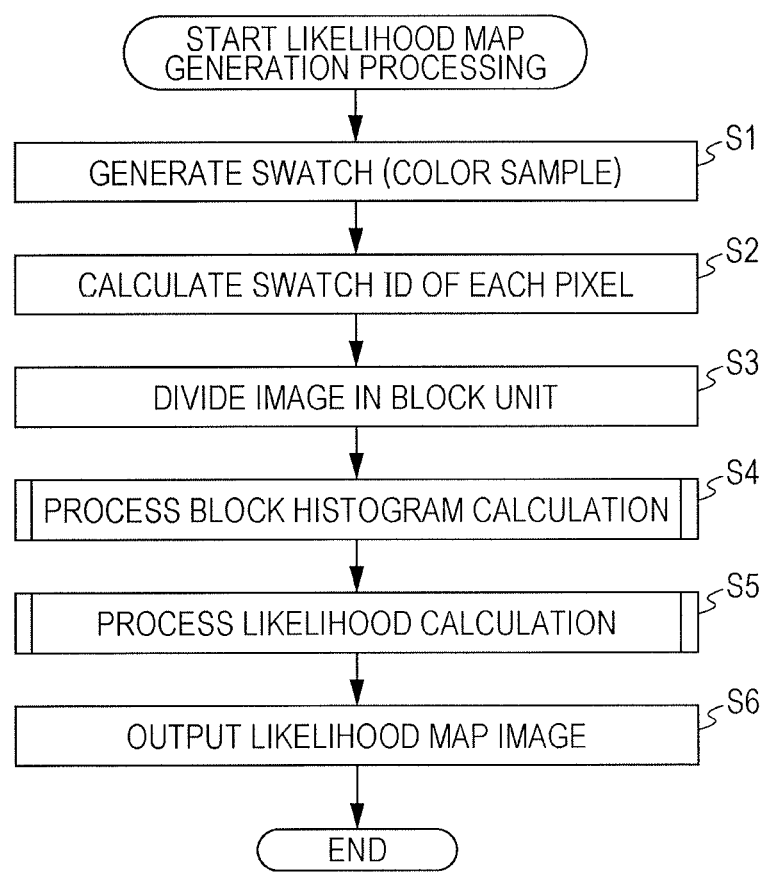
FIG. 3 is a flowchart illustrating a likelihood map generation process by the likelihood map calculation device of FIG. 1.

Return to the illustration of the flowchart of FIG. 3 here.

When the foreground block histograms and the background block histograms of the whole blocks are obtained by the block histogram calculation of step S4, the process proceeds to step S5.

In the step S5, the pixel likelihood calculation unit 24 performs a likelihood calculation process and calculates the likelihood of the pixels on the basis of the information on the mark showing the foreground and the background, the information on the swatch and the swatch ID, and the foreground block histograms and the background block histograms of the blocks.

[Likelihood Calculation Process]

Figure 8:
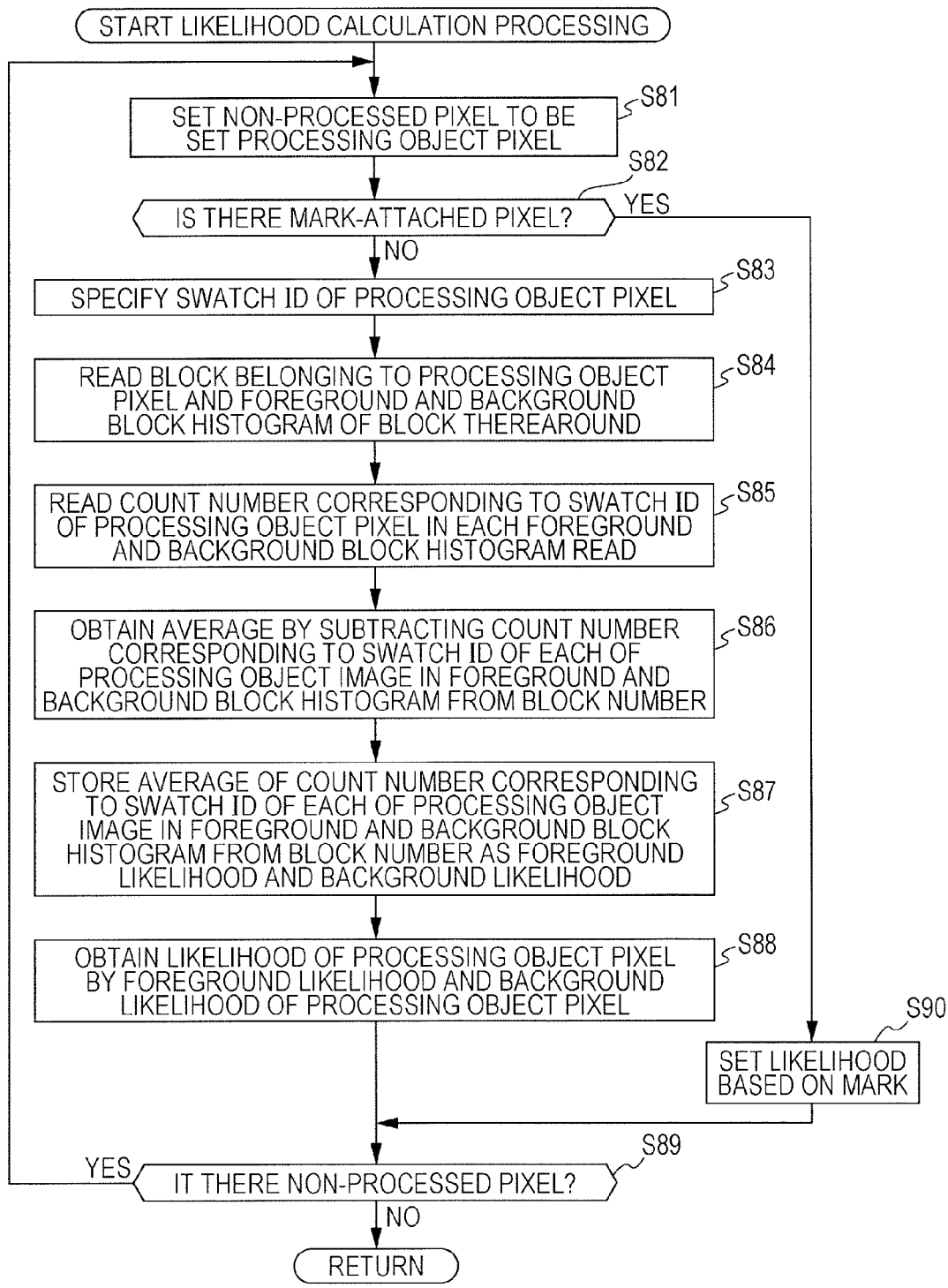
FIG. 8 is a flowchart illustrating a likelihood calculation process by the likelihood map calculating device of FIG. 7.

Here, the likelihood calculation process is described with reference to the flowchart of FIG. 8.

In step S81, the pixel likelihood calculation unit 24 sets non-processed pixels of the input image as process-object pixels.

In step S82, the pixel likelihood calculation unit 24 determines whether the process-object pixels are pixels with the marks discriminating the foreground or the background. In step S82, for example, when the pixels are pixels with marks, the process proceeds to step S90.

That is, in step S82, when there is a pixel with the mark, it is clearly any one pixel for the foreground or the background, such that in step S90, the pixel likelihood calculation unit 24 sets the likelihood in accordance with the information on the mark. That is, where the mark represents the foreground, the pixel likelihood calculation unit 24 sets the likelihood of the process-object pixel to 1.0 and sets the likelihood of the process-object pixel for the background to 0.0, and the process proceeds to step S89.

Meanwhile, in step S82, for example, when there is a pixel without the mark, in step S83, the pixel likelihood calculation unit 24 specifies the swatch ID of the process-object pixel.

In step S84, pixel likelihood calculation unit 24 reads out the block where the process-object pixel corresponding to the process-object pixel pertains, and the foreground block histogram and the background block histogram of the block around the pixel.

In step S85, pixel likelihood calculation unit 24 reads out the number of normalization count of the swatch ID of the pixel position corresponding to the process-object pixel, on the basis of the block of the process-object pixel, and the foreground block histogram and the background block histogram of the block around the pixel.

In step S86, pixel likelihood calculation unit 24 obtains the average of the number of normalization count of the swatch ID of the pixel position corresponding to the block of the read-out process-object pixel and the process-object pixel of the foreground block histogram and the background block histogram of the block around the pixel.

In step S87, pixel likelihood calculation unit 24 stores the obtained average of the number of normalization count of the swatch ID of the pixel position corresponding to the block of the read-out process-object pixel and the process-object pixel of the foreground block histogram and the background block histogram of the block around the pixel, as the foreground likelihood and the background likelihood. The block around the block where the process-object pixel pertains, which is described in the embodiment, means, for example, eight blocks adjacent in the up-down and left-right directions and inclined directions from the block where the process-object pixel pertains. By referring to the histograms of the adjacent blocks, as described above, the referred block histograms overlap the adjacent blocks including the blocks where the process-object pixel pertains, such that it is possible to prevent a large change in the likelihood at the block border, thereby achieving a more stable value. Further, the local regions may be defined to overlap each other. In this case, the pixels of the overlapping portion are counted for the histograms of both blocks, but it may be defined as another block because it is preferable to obtain the entire ratio to the total number of the histograms. Further, when the likelihood of the pixel is calculated, only the block histogram of the block where the process-object pixel pertains may be used and the process load may be reduced such that the process speed increases.

In step S88, the pixel likelihood calculation unit 24 obtains the likelihood of the process-object pixel by calculating the following formula (3), using the stored foreground likelihood and background likelihood.

$$Pr(x)=PrF(x)/(PrF(x)+PrB(x)) \quad (3)$$

where Pr(x) represents the likelihood of the process-object image and PrF(x) represents the average value of the normalization count number of the foreground block histogram corresponding to the swatch ID of the process-object pixel, of the block where the process-object pixel pertains and a block around the block, that is, the foreground likelihood. Further, PrB(x) represent the average value of the normalization count number of the background block histogram corresponding to the swatch ID of the process-object pixel, of the block where the process-object pixel pertains and a block around the block, that is, the background likelihood.

That is, since the normalization count number corresponding to the swatch IDs of the foreground block histograms and the background block histograms of the blocks is the likelihood itself of the process-object pixel in the local region, it is possible to obtain the likelihood in a pixel unit, using the foreground likelihood and the background likelihood obtained as the normalization count number.

In step S89, the pixel likelihood calculation unit 24 determines whether there is a non-process pixel, and when there is a non-processed pixel, the process returns to step S81. That is, the processes of step S81 to S90 are repeated until the likelihood of all of the pixels are obtained.

Further, in step S89, when there is no non-processed pixel, the process is finished.

It is possible to obtain likelihood in a pixel unit by the processes described above.

Return to the illustration of the flowchart of FIG. 3 here.

When the likelihood of all pixels is obtained by the process in step S5, in step S6, the pixel likelihood calculation unit 24 generates an image composed of the pixel value corresponding to the obtained likelihood of the pixels and outputs the image as a likelihood map image.

The block histograms for the foreground and the background, which are obtained on the basis of the marked information for each local region are obtained as feature vectors of the local region, by the process described above. Further, for a block composed of pixels that lack marked information, the block histograms are obtained by interpolation, using the obtained block histograms and a feature distribution model is obtained. Further, for a block including a lot of marked pixels and for a block that lacks marked pixels, the foreground block histograms and the background block histograms are implemented from the obtained block histograms as feature vectors and the obtained block histograms as a feature distribution model, respectively, the foreground likelihood and the background likelihood are obtained in a pixel unit from the normalization count number corresponding to the pixels and the likelihood of the pixel are obtained from the foreground likelihood and the background likelihood, respectively. Therefore, it is possible to precisely separate the object image which is a foreground image from the input image, using the likelihood map image composed of the obtained likelihood in a pixel unit.

Further, in the above description, the foreground block histograms and the background block histograms constitute the feature vectors of the local area of the dimension of the number Sn of color samples, using the feature vector, the foreground block histograms and the background block histograms of the foreground interpolation-object blocks and the background interpolation-object blocks are obtained as the feature distribution model composed of the same-dimensional vectors as the feature vectors, and the pixel likelihood is calculated from feature distribution model. However, since it is preferable that the feature vectors of a local region of the input image are obtained from the local region of the input image, the vectors are not limited to the vectors composed of the color sample lines, and for example, may be motion vector, depth, filter response value, and normal vectors and the like. Further, the feature vectors may be all of a plurality of types of vectors, such as the vectors of the color samples and the motion vector, the depth, the filter response value, and the normal vectors, or some combination.

2. Second Embodiment

[Another Configuration Example of a Likelihood Map Calculation Device]

In the description above, since the block histograms for the foreground and the background are not obtained in a block unit by calculation, for a block that is lack of marked pixel, using the histograms of the whole blocks of which the block histograms can be obtained, it is necessary to interpolate the obtained block histograms of the block, such that it is expected that the process load increases.

Since the calculation process is reduced by the interpolation of the block histogram, it may be considered to improve the process speed by reducing the process load.

Figure 9:
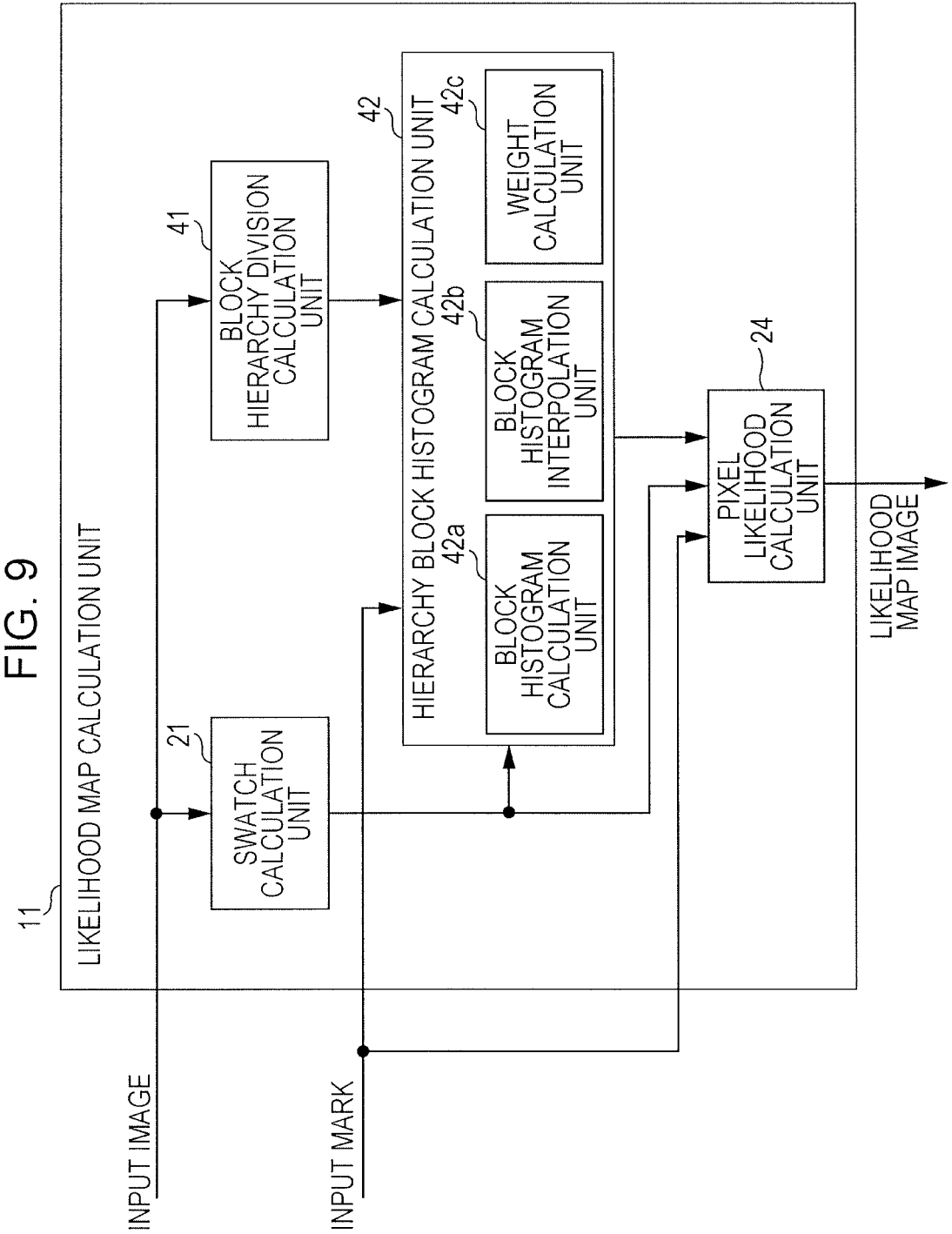
FIG. 9 is a block diagram showing the configuration example of another embodiment of a likelihood map calculating device where the present disclosure is applied.

FIG. 9 shows a configuration example of another embodiment of hardware of a likelihood map calculating device that can reduce load relating to the interpolation process of the block histograms, in the likelihood map calculation device of FIG. 1. Further, for the likelihood map calculation device 11 of FIG. 9, the same components as those of the likelihood map 11 of FIG. 1 are indicated by the same names and reference numerals, and the description is appropriately omitted.

That is, the difference of the likelihood map calculation device 11 of FIG. 9 from the likelihood map calculation device 11 of FIG. 1 is to include a block hierarchy division calculation unit 41 and a hierarchy block histogram calculation unit 42, instead of the block histogram calculation unit 22 and the block histogram interpolation unit 23.

The block hierarchy division calculation unit 41 forms a block having a hierarchical structure by hierarchically dividing the input image into different sized blocks as much as the hierarchy number Sm and supplies the information to the hierarchy block histogram calculation unit 42. Further, the hierarchy number Sm is a parameter that is optionally set.

The hierarchy block histogram calculation unit 42 obtains foreground block histograms and background block histograms in the same way described above, sequentially from the uppermost hierarchy, that is, the block of the hierarchy having the largest block size, in the blocks. In more detail, the hierarchy block histogram calculation unit 42 includes a block histogram calculation unit 42a, a block histogram calculation unit 42b, and a weight calculation unit 42c. The hierarchy block histogram calculation unit 42 calculates the block histograms for the foreground and the background sequentially from the upper hierarchy by controlling the block histogram calculation unit 42a having substantially the same function as the block histogram calculation unit 22. The hierarchy block histogram calculation unit 42 interpolates the block histograms, for the block of which the block histograms are not obtained, using the block histograms of the block of the upper hierarch and the blocks around the block by controlling the block histogram interpolation unit 42b having substantially the same function as the block histogram interpolation unit 23. In this case, the hierarchy block histogram calculation unit 42 sets the weight corresponding to the distance between the centers of the process-object block and the block of the upper hierarchy used for the interpolation, by controlling the weight calculation unit 42c having substantially the same function as the weight calculation unit 23a.

[Likelihood Map Generation Process]

Figure 10:
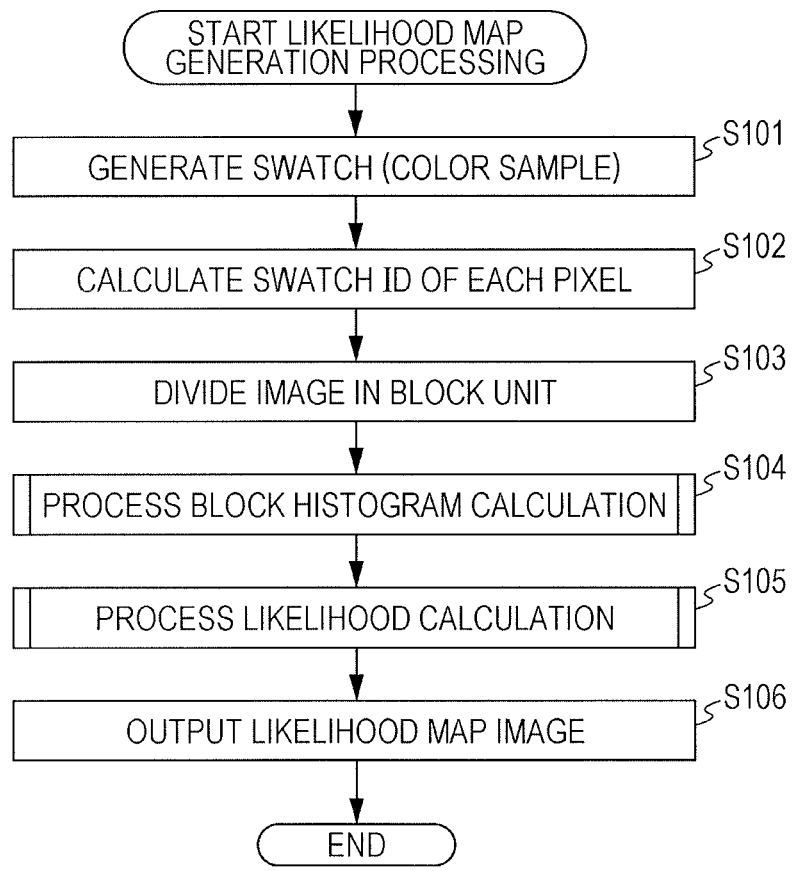
FIG. 10 is a flowchart illustrating a likelihood map generating process by the likelihood map calculating device of FIG. 9.

A likelihood map generation process by the likelihood map calculation device 11 of FIG. 9 is described with reference to the flowchart of FIG. 10. Further, since the processes of steps S101, S102, S105, and S106 of FIG. 10 are the same as the processes of step S1, S2, S5, and S6 illustrated with reference to FIG. 3, the description is omitted.

That is, when a swatch is obtained in step S101 and a swatch ID is obtained in a pixel unit in step S102, in step S103, the block hierarchy division calculation unit 41 hierarchically generates blocks in a tetrameric structure having an hierarchical structure by repeating a process of spatially dividing an image in four parts. That is, the block hierarchy division calculation unit 41, for example, as shown at the left side of FIG. 11, divides a node to have four child nodes by starting from the rectangle of the image resolution. The block hierarchy division calculation unit 41 performs the four-division such that the rectangles are uniform and repeats the division process to the depth of the hierarchy Sm.

Figure 11:
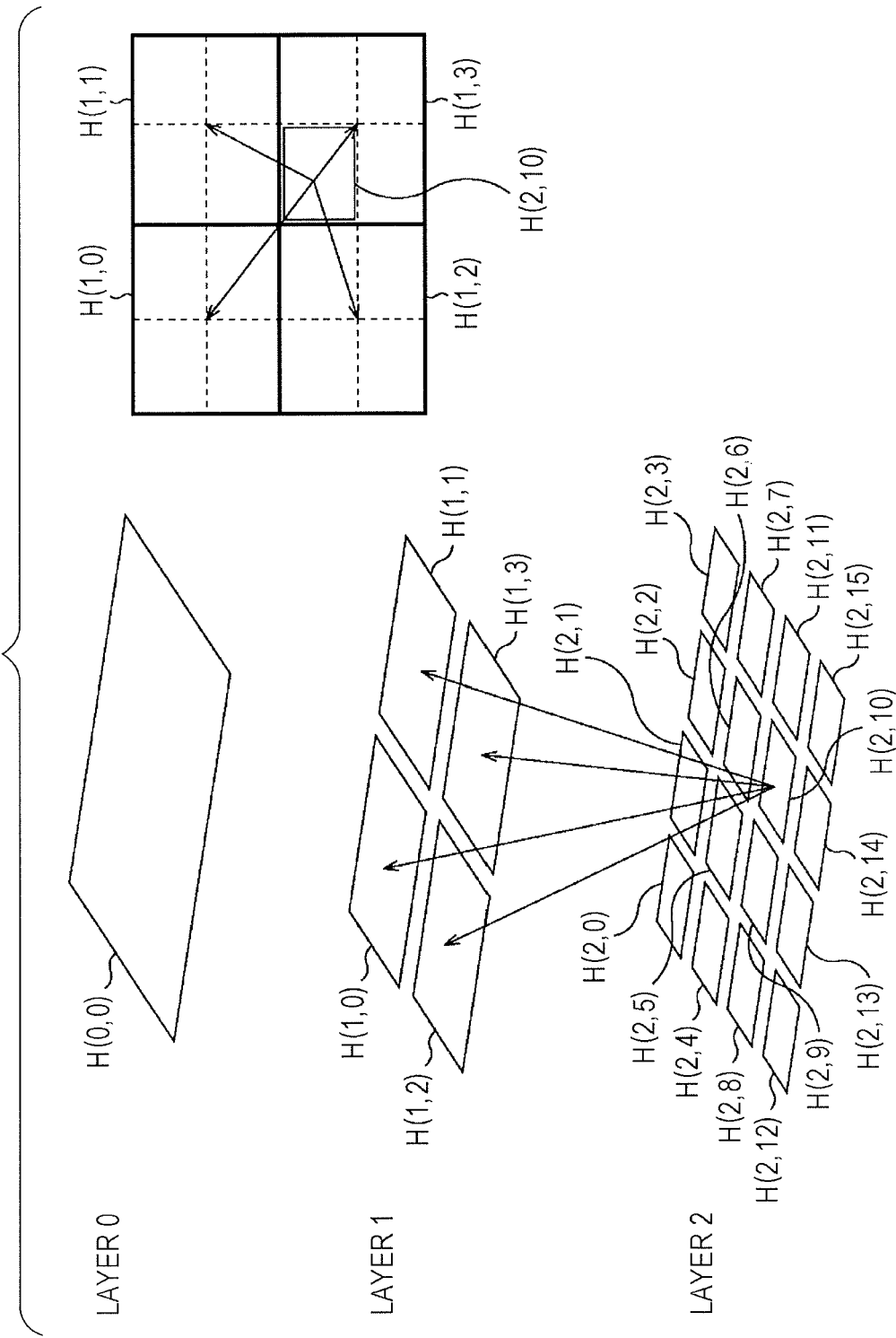
FIG. 11 is a diagram showing an example of hierarchy division and interpolation calculation generated by the likelihood map calculating device of FIG. 9.

In FIG. 11, the hierarchy of the uppermost hierarchy from the top is 0 and the block is a block H (0,0). Further, the block hierarchy division calculation unit 41 generates blocks H (1,0), H (1,1), H (1,2), and H (1,3) of a hierarchy 1 lower by one hierarchy by uniformly dividing the block H (0,0) into four part. Further, the block hierarchy division calculation unit 41 generates blocks H (2,0), H (2,1), H (2,5), and H (2,4) of a hierarchy 2 lower by one hierarchy by uniformly dividing the block H (1,0) into four part. Similarly, the block hierarchy division calculation unit 41 generates blocks H (2,2), H (2,3), H (2,7), and H (2,6) of a hierarchy 2 lower by one hierarchy by uniformly dividing the block H (1,1) into four part. Similarly, the block hierarchy division calculation unit 41 generates blocks H (2,8), H (2,9), H (2,12), and H (2,13) of a hierarchy 2 lower by one hierarchy by uniformly dividing the block H (1,2) into four part. Further, the block hierarchy division calculation unit 41 generates blocks H (2,10), H (2,11), H (2,14), and H (2,15) of a hierarchy 2 lower by one hierarchy by uniformly dividing the block H (1,3) into four part. That is, in the hierarch 2, the block hierarchy division calculation unit 41 divides and generates sixteen blocks from the block H (2,1) to the block (2, 15).

As described above, blocks of each hierarchy are implemented by repeating four-division until reaching the hierarchy Sm. Further, since it is preferable that uniform division is possible, if the blocks can be uniformly divided, other ways than the four-division may be possible.

In step S104, the hierarchy block histogram calculation unit 42 performs a block histogram calculation process, repeats a process of obtaining block histograms for the hierarchies sequentially from the upper hierarchy, and calculates foreground block histograms and background block histogram of the hierarchy Sm that is the lowermost hierarchy.

[Block Histogram Calculation Process]

Figure 12:
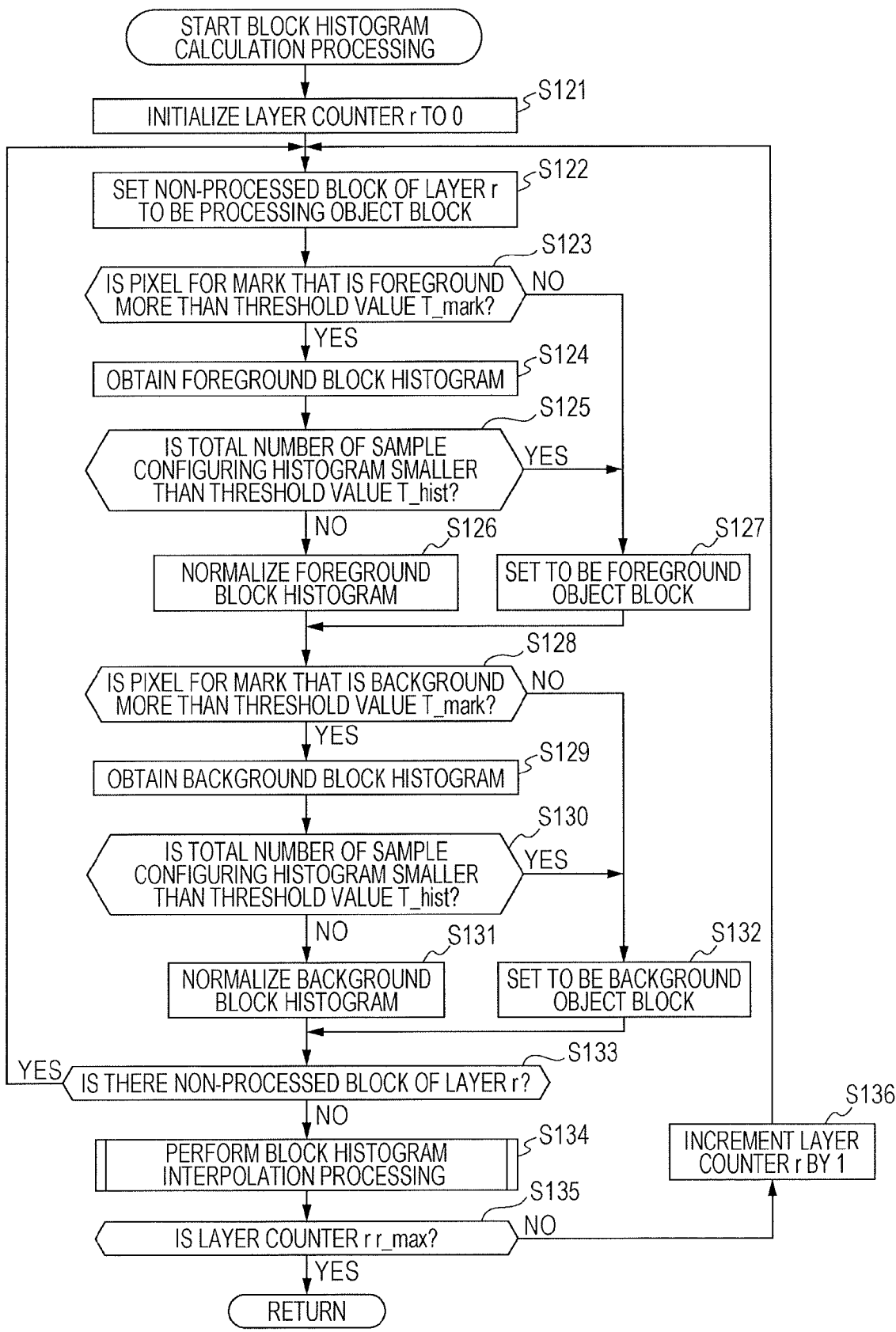
FIG. 12 is a flowchart illustrating a block histogram calculation process by the likelihood map calculating device of FIG. 9.

A block histogram calculation process by the hierarchy block histogram calculation unit 43 of FIG. 9 is described with reference to the flowchart in FIG. 12. Further, the processes of steps S122 to S133 in the flowchart of FIG. 12 are processes corresponding to the processes of steps S21 to S32 in the flowchart of FIG. 4 and the description is appropriately omitted.

That is, in step S121, the hierarchy block histogram calculation unit 43 initializes the hierarchy count r for counting the hierarchies into 0. Further, the in the hierarchy count r, it is assumed that when the hierarchy count r is 0, the hierarchy is the uppermost hierarchy in the same way, and when the hierarchy count r is Sm, the hierarchy is the lowermost hierarchy.

In steps S122 to S133, the hierarchy block histogram calculation unit 43 performs processes the same as those in steps S21 to S32 in FIG. 4, for the blocks in the hierarchy r, by controlling the block histogram calculation unit 42a. By the processes, the foreground block histograms and the background block histograms of the hierarchy r are obtained, and foreground interpolation-object blocks and background interpolation-object blocks are set for the blocks that are not obtained.

When the foreground block histograms and the background block histograms of the hierarchy r are obtained by repeating the processes of steps S122 to S133 and the blocks that are not obtained are set to foreground interpolation-object blocks and background interpolation-object blocks, the process proceeds to step S134.

In step S134, the hierarchy block histogram calculation unit 43 performs a block histogram interpolation process by controlling the block histogram interpolation unit 42b, and obtains the foreground block histograms and the background block histograms, using the foreground block histograms and the background block histograms of an adjacent block of a hierarchy r−1 that is upper hierarchy than the hierarchies r, for the blocks that are set to the foreground interpolation-object blocks and background interpolation-object blocks.

[Block Histogram Interpolation Process]

Figure 13:
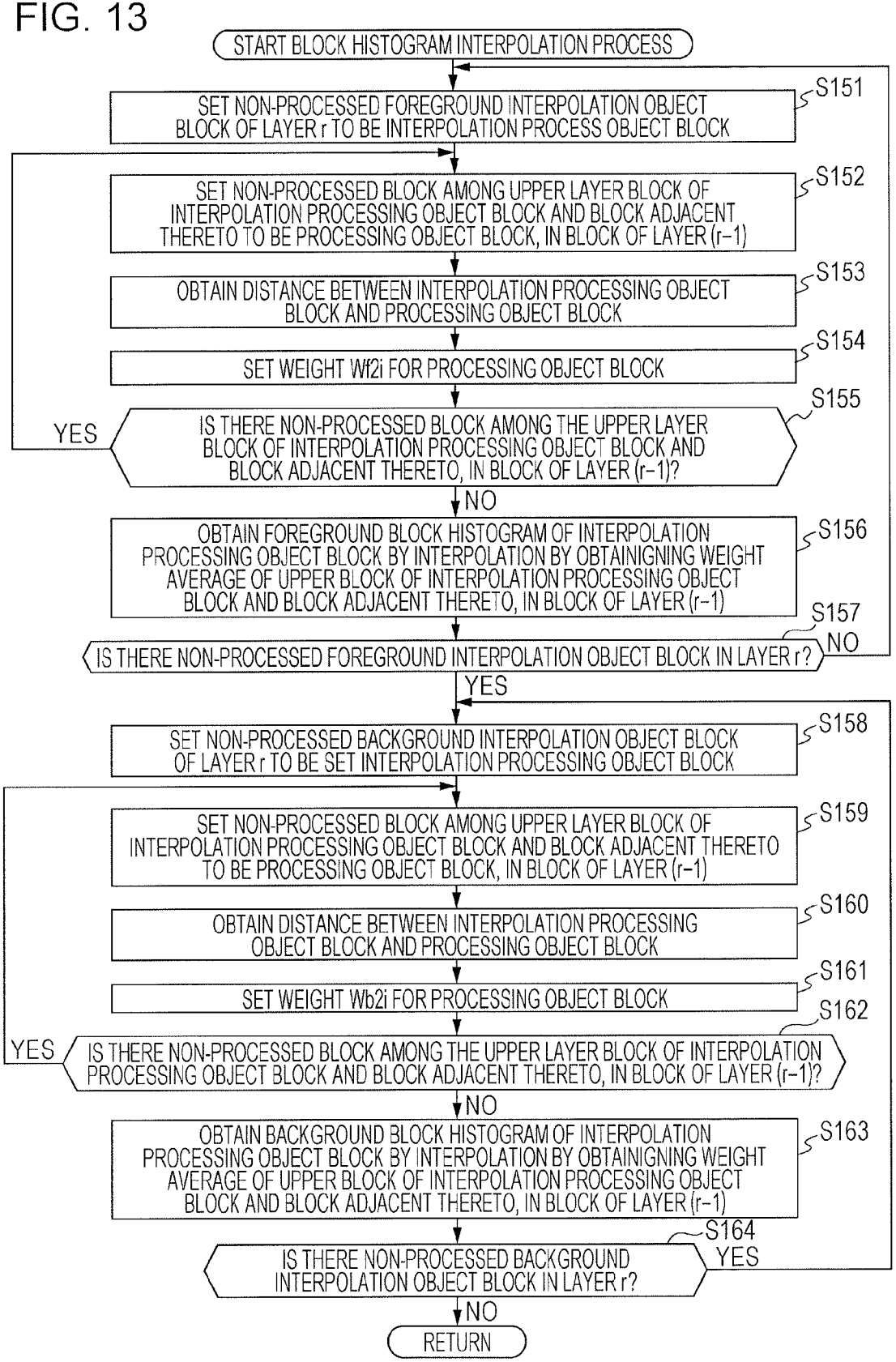
FIG. 13 is a flowchart illustrating a block histogram interpolation process by the likelihood map calculating device of FIG. 9.

A block histogram interpolation process that is performed by the hierarchy block histogram calculation unit 43 controlling the block histogram interpolation unit 42b is illustrated with reference to the flowchart of FIG. 13.

In step S151, the block histogram interpolation unit 42b sets a non-processed foreground interpolation-object block of the hierarchy r as an interpolation process-object block.

In step S152, the block histogram interpolation unit 42b, in the hierarchy r−1 that is a upper hierarchy than the hierarchy r, sets a non-processed block in the upper hierarchy block of the interpolation process-object block and the adjacent block as a process-object block BLi. Further, "i" is an identifier for identifying the upper hierarchy block of the interpolation process-object block and the adjacent block. That is, in the case of FIG. 11, when the hierarchy r is 2 and the interpolation process-object block is the block H (2,10), the upper hierarchy block of the interpolation process-object block is the block H (1,3) where the block H (2,10) pertains before division. Further, the upper hierarchy block of the interpolation process-object block and the adjacent blocks are the blocks H (1,0), H (1,1), and H (1,2) that are adjacent to the block H (1,3).

In step S153, the block histogram interpolation unit 42b obtains the distance di between the interpolation-object block and the process-object block BLi. In more detail, the block histogram interpolation unit 42b obtains the distance between the center position of the interpolation process-object block and the center position of the process-object block as the distance di.

In step S154, the block histogram interpolation unit 42b sets a weight Wf2i corresponding to the process-object block by calculating in the same way as the above formula (1) on the basis of the obtained distance di by controlling the weight calculation unit 42c.

In step S155, the block histogram interpolation unit 42b determines whether there is a non-processed block in the upper hierarchy block of the interpolation-object block and the block adjacent to the block, for the blocks of the hierarchy r−1. In step S155, for example, when it is determined there is a non-processed block, the process returns to step S152. That is, when the interpolation process-object block of FIG. 11 is the block H (2,10), as shown at the right side of FIG. 11, the distances between the center position of the block H (2,10) and the blocks H (1,0), H (1,1), H (1,2), and H (1,3) and the weights Wf2i (i=1 to 4) corresponding to the distances are obtained by repeating the processes of steps S152 to S155.

Further, in step S155, for the blocks of the hierarchy r−1, when it is determined there is no non-processed block, in the upper hierarchy block of the interpolation-object block and the block adjacent to the block, the process proceeds to step S156.

In step S156, the block histogram interpolation unit 42b interpolates the block histograms of the interpolation process-object blocks by obtaining the average value with the weights Wf2i of the blocks, for the blocks of the upper hierarchy and the block adjacent to the block, by replacing the weight Wf1i with the weight Wf2i and calculating the equation expressed in the formula (2). Further, the block histogram interpolation unit 42b supplies the block histograms obtained by the interpolation to the pixel likelihood calculation unit 24, as interpolation process-object blocks and foreground block histograms of the hierarchy r.

In step S157, the block histogram interpolation unit 42b determines whether there is a non-processed foreground interpolation-object block of the hierarchy r, and when it exists, the process returns to step S151. That is, for all of the foreground interpolation-object blocks of the hierarchy r, the processes of steps S151 to S157 are repeated until the foreground block histograms are obtained by interpolation using the foreground block histograms of the blocks of the upper hierarchy and the block adjacent to the block. Further, in step S157, when there is no non-processed foreground interpolation-object block of the hierarchy r, that is, when it is determined that a foreground block histogram is obtained by the interpolation, for all of the foreground interpolation-object blocks of the hierarchy r, the process proceeds to step S158.

Further, the processes in steps S158 to S164 are the same as the process in steps S151 to S157 except that the block that is the process-object is a background interpolation-object block instead of the foreground interpolation-object block and the expression of the weight is a weight Wb2$i$ instead of the weight Wf2$i$, and the description is not provided.

That is, according to the above processes, since it is possible to interpolate the used block histograms of the interpolation-object blocks and implement the block histograms for four blocks even at the most, it is possible to restrain the calculation amount due to the interpolation. Further, since the block histograms used for the interpolation are form the blocks of the upper hierarch and the adjacent block, it is possible to restrain accuracy from being reduced by the interpolation.

Return to the illustration of the flowchart of FIG. 12 here.

By the process of step S134, when the block histogram interpolation process is performed, in step S135, the hierarchy block histogram calculation unit 43 determines whether hierarchy count r is the maximum value r_max, that is, the process for the lowermost hierarchy is finished, and when it is not the maximum value r_max, the process proceeds to step S136.

In step S136, the hierarchy block histogram calculation unit 43 increases the hierarchy count r by one and the process returns to step S122. That is, the processes of steps S122 to S136 are repeated until the block histograms for the foreground and the background are obtained in all of the hierarchies.

Further, in step S135, when it is determined that the hierarchy count r is the maximum value r_max, the process is finished.

That is, as the foreground block histograms and the background block histograms for all of the blocks to the lowermost hierarchy are obtained by the processes, likelihood calculation process is performed, using the blocks of the lowermost hierarchy and the likelihood is calculated in a pixel unit.

By the above processes, it is possible to restrain the calculation amount relating to the interpolation when obtaining the block histograms for the foreground and the background. Accordingly, it is possible to performs a process of separating an object image from an input image at high speed with high accuracy.

Further, an example of obtaining the block histograms already obtained, as the average with weights by adding the weight according to the distances in the image space between the blocks of which the block histograms are obtained, in the same image space, when generating the block histograms for the foreground and the background by interpolation, is described above. However, for motion images and the like, blocks of which the block histograms are obtained my be used between the previous and later frames by motion vectors.

Figure 14:
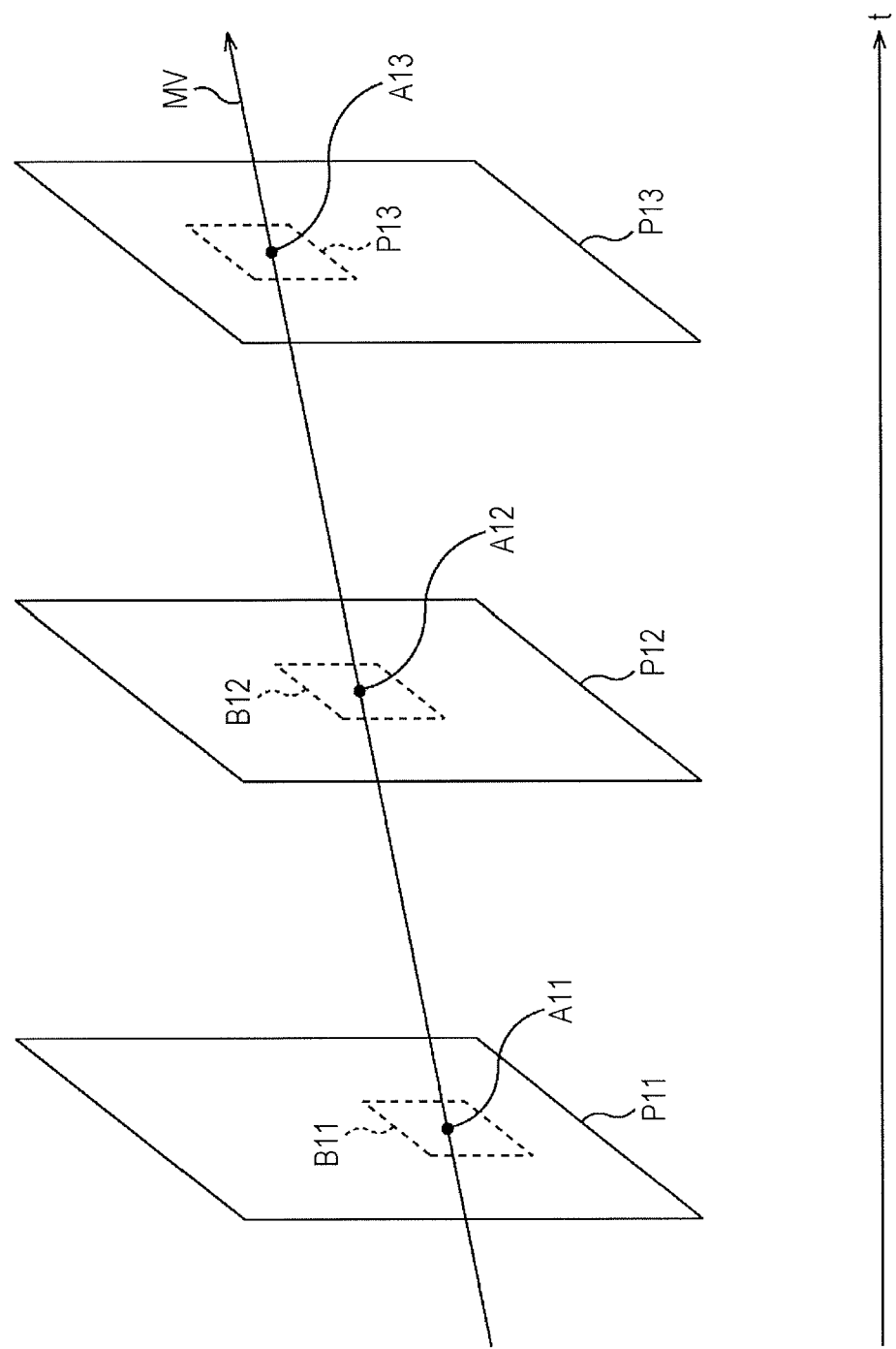
FIG. 14 is a diagram illustrating an example of applying the likelihood map generation process by the likelihood map calculation device of FIGS. 1 and 9 to a motion image.

That is, for example, as shown in FIG. 14, when there is a motion image composed of images P11 to P13, the block B12 is considered as an interpolation-object block. Further, it is assumed that it is known that all of the blocks B11 to B13 correspond, on the basis of the pixels A11 and A13 corresponding by the motion vector MV of the pixel A12 on the block B12. In this case, for the block histogram of the block B12 that is the interpolation-object block, the block histograms of the blocks B11 and B13 may be interpolated by the average with weights corresponding to the distance between frames. Further, the position in the space between different frames, the block histogram may be interpolated by the average with weights corresponding to the distance in the image space and the distance between frames, by adding the weight in the same way as that described above.

Further, although an example of two-dimensional symmetric image is described in the above embodiment, the same likelihood calculation is possible for three or more-dimensional spatial data.

Figure 15:
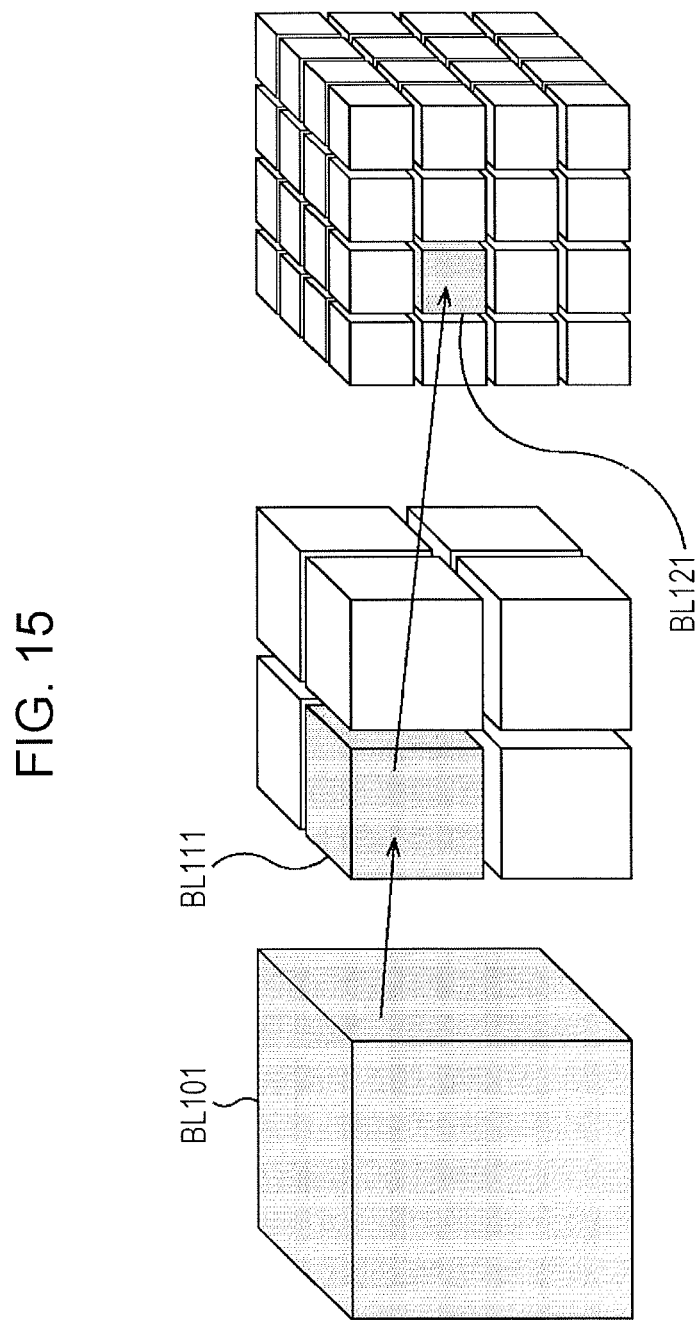
FIG. 15 is a diagram illustrating an example of applying the likelihood map generation process by the likelihood map calculation device of FIGS. 1 and 9 to a three-dimensional data.

For example, as shown in FIG. 15, the same likelihood calculation is possible for three-dimensional spatial data. The three-dimensional data is called volume data, and access to the pixels are made in a two dimension of x and y for two-dimensional images, whereas the access is made in a three dimension of x, y, and z for three-dimensional images. The three-dimensional data is also called voxel.

For the three-dimensional data, designation of an input mark can be implemented by an automatic process method, for example, it is possible to select data of pixels with automatically attached marks through a threshold value process.

Further, the likelihood map generation process using three-dimensional data is substantially the same as the likelihood map generation process illustrate with reference to the flowchart of FIG. 3.

That is, in step S1, swatch calculation for three-dimensional data is, as the same way for the two dimension, is calculation by statistical machine learning using data of all pixels included in the three-dimension data.

In step S2, the swatch IDs of the pixels is the same as the two dimension, and swatch IDs the closest to their colors may be assigned from the line of color samples of swatches obtained in the process of step S1.

In the division process in a block unit in step S3, a two-dimensional block having a predetermined size for the two-dimensional image may be replaced by a three-dimensional rectangle block, as shown in FIG. 15. In FIG. 15, a block obtained by uniformly dividing the block BL101 into ⅛ is the block BL111. Further, a block obtained by uniformly dividing the block BL111 into ⅛ is the block BL121.

In step S4, in the block histogram calculation process, the histogram is made by collecting the swatch IDs included in the three-dimensional rectangle block.

In the likelihood calculation process in step S5, in the same way for the two-dimensional image, likelihood based on the swatch IDs of the pixels are calculated and assigned, using the histograms obtained for the rectangular blocks. In the interpolation of the foreground and background interpolation-object blocks, since the distance calculation to the rectangular block that is the reference source is just changed from the two dimension to the three dimension, such that, the Euclid distances or the like between the blocks are interpolated as weights, in the same way as the two dimension.

An example of simplifying the calculation by applying a hierarchical structure can be applied in the same way, while the hierarchical structure of the two-dimensional block becomes a hierarchical structure of a three-dimensional rectangle block.

In this consideration, the likelihood calculation device can be applied, independent of the dimensional number of the data structure and the vector-dimensional number of the pixels. Further, even if the amount of input data is increased with an increase in dimensional number, the process can be implemented with a predetermined amount of memory by reducing the number Sn of color samples of swatches.

According to the present disclosure, it is possible to separate an object image from an input image, with high accuracy.

However, the series of processes described above may be performed by hardware, but may be performed by software. When the series of processes are performed by software, various functions can be performed by a computer with exclusive hardware where the programs constituting the software are coded, or by installing various programs, and for example, the programs are installed from a recording medium to a common personal computer.

Figure 16:
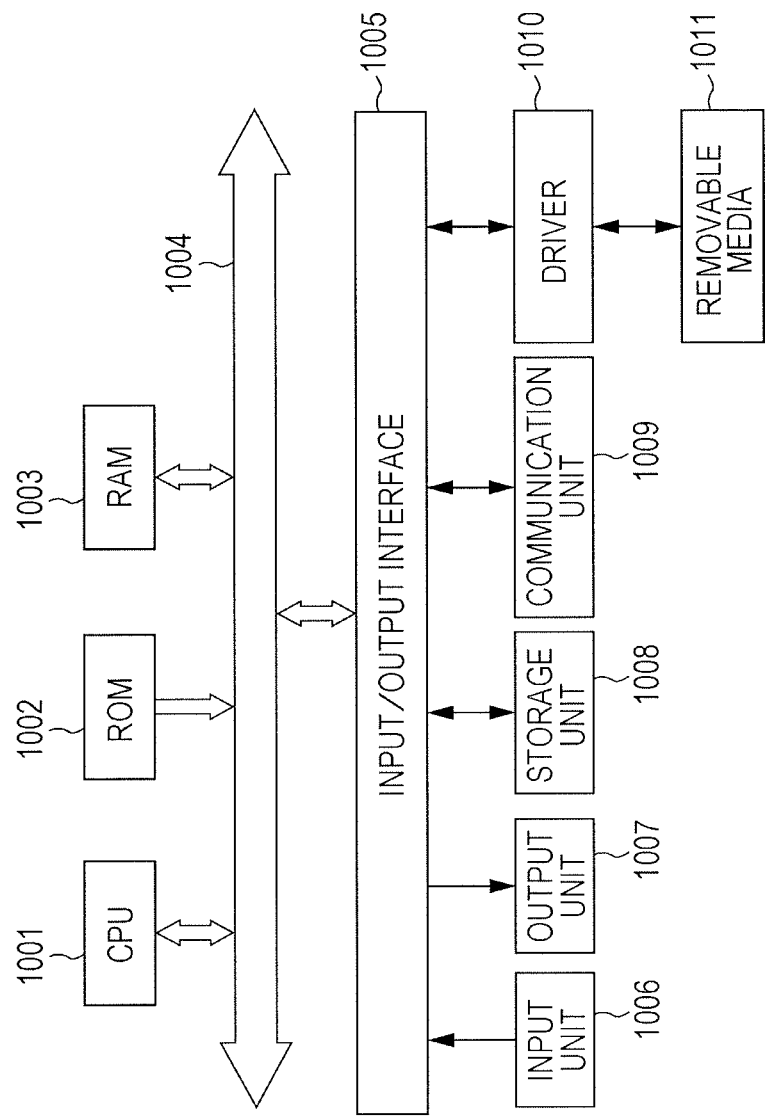
FIG. 16 is a diagram illustrating an example of the configuration of a common personal computer.

FIG. 16 shows a configuration example of a common personal computer. The personal computer includes a built-in CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006 that is implemented by an input device, such as a keyboard or a mouse, for a user to input operation command, an output unit 1007 that outputs a process operation screen or an image of the process result on a display device, a storage unit 1008 that is implemented by a hard disc drive storing programs or various data, and a communication unit 1009 that is implemented by a LAN (Local Area Network) adaptor and performs a communication process through a network, typically internet, are connected to the input/output interface 1005. Further, a drive 1010 that reads/writes data on a removable medium 1011, such as a magnetic disc (including a flexible disc), an optical disc (including a CD-ROM (Compact Disc Read Only Memory) and a DVD (Digital Versatile Disc)), an optical magnetic disc (MD (Mini Disc)), or a semiconductor memory, is connected.

The CPU 1001 performs various processes in accordance with the programs stored in the ROM 1002, or the programs that are read out from a removable medium 1011, such as the magnetic disc, optical disc, optical magnetic disc, or semiconductor memory, installed on the storage unit 1008, and then loaded on the RAM 1003 from the storage unit 1008. Data for the CPU 1001 to perform various processes is appropriately stored on the RAM 1003.

Further, in the specification, the steps describing the programs that are recorded on a recording medium include processes that are performed in parallel or individually, even if the processes that are performed in time series in the described order are not necessarily processed in time series.

The present disclosure contains subject matter related to that disclosed in Japanese Priority Patent Application JP 2010-199106 filed in the Japan Patent Office on Sep. 6, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a feature vector extraction unit that extracts feature vectors of sample pixels, for each local region including the sample pixels, in an input image;
a weight calculation unit that calculates weights for the local regions on the basis of the positional relationship with the local regions, for divided regions that divide the input image;
a feature distribution model calculation unit that calculates an average with weights as a feature distribution model in the local region obtained by adding the weights calculated for the local regions to the feature vectors of the local regions, for each of the divided regions; and
a pixel likelihood calculation unit that calculates pixel likelihood for each pixel in the input image on the basis of the feature distribution model,
wherein the feature distribution model calculation unit generates multidimensional histograms of quantized quantization vectors of the local regions, for each of the divided regions, adds the weights to the multidimensional histogram, and calculates the feature distribution model of the divided regions, and
wherein at least one of the feature vector extraction unit, the weight calculation unit, the feature distribution model calculation unit, and the pixel likelihood calculation unit is implemented via a processor.

2. The image processing apparatus according to claim 1, wherein the feature vector extraction unit extracts the color of the pixels in the local region, a motion vector, depth, a filter response value, or a normal vector as the feature vector, for each of the local regions including the sample pixels in the input image.

3. The image processing apparatus according to claim 1, wherein the sample pixels include information of discriminating the position where an object exists in the image.

4. The image processing apparatus according to claim 1, wherein the weight calculation unit calculates weights for the local regions, for each of the divided regions, on the basis of the distances between the divided regions and the local regions in an image space, or the distance between frames in a motion image implemented by a plurality of the images.

5. The image processing apparatus according to claim 1, wherein the local regions and the divided regions are block structures that hierarchically divide the input image, and the weight calculation unit calculate weights for the local regions, for each of the divided regions, on the basis of the distances between the divided regions and the local regions of an upper hierarchy than the hierarchy of the divided regions in the input image in an image space, or the distance between frames in a motion image implemented by a plurality of images.

6. An image processing apparatus comprising:
a feature vector extraction unit that extracts feature vectors of sample pixels, for each local region including the sample pixels, in an input image;
a weight calculation unit that calculates weights for the local regions on the basis of the positional relationship with the local regions, for divided regions that divide the input image;
a feature distribution model calculation unit that calculates an average with weights as a feature distribution model in the local region obtained by adding the weights calculated for the local regions to the feature vectors of the local regions, for each of the divided regions; and
a pixel likelihood calculation unit that calculates pixel likelihood for each pixel in the input image on the basis of the feature distribution model,
wherein the feature distribution model calculation unit obtains color samples from two or more representative colors of the input image, adds the weight to histograms of the identification number of the color samples in the local regions, and calculates the feature distribution model of the divided regions, and
wherein at least one of the feature vector extraction unit, the weight calculation unit, the feature distribution model calculation unit, and the pixel likelihood calculation unit is implemented via a processor.

7. An image processing method comprising:
extracting feature vectors of sample pixels, for each local region including the sample pixels, in an input image;
calculating weights for the local regions on the basis of the positional relationship with the local regions, for divided regions that divide the input image;
calculating an average with weights obtained by adding the weights calculated for the local regions to the feature vectors of the local regions, for each of the divided regions, as a feature distribution model of the local regions; and calculating pixel likelihood for each of the pixels in the input image on the basis of the feature distribution model, wherein the method further comprises generating multidimensional histograms of quantized quantization vectors of the local regions, for each of the divided regions, adding the weights to the multidimensional histogram, and calculating the feature distribution model of the divided regions.

8. A non-transitory computer-readable medium having embodied thereon a program, which when executed by a computer causes the computer to perform a method, the method comprising:

extracting feature vectors of sample pixels, for each local region including the sample pixels, in an input image;

calculating weights for the local regions on the basis of the positional relationship with the local regions, for divided regions that divide the input image;

calculating an average with weights obtained by adding the weights calculated for the local regions to the feature vectors of the local regions, for each of the divided regions, as a feature distribution model of the local regions; and calculating pixel likelihood for each of the pixels in the input image on the basis of the feature distribution model, wherein the method further comprises generating multidimensional histograms of quantized quantization vectors of the local regions, for each of the divided regions, adding the weights to the multidimensional histogram, and calculating the feature distribution model of the divided regions.

* * * * *